US009890223B2

(12) United States Patent
Nakamura et al.

(10) Patent No.: US 9,890,223 B2
(45) Date of Patent: Feb. 13, 2018

(54) RESIN PARTICLES AND PROCESS FOR PRODUCING SAME, ANTIGLARE FILM, LIGHT-DIFFUSING RESIN COMPOSITION, AND EXTERNAL PREPARATION

(75) Inventors: Masaaki Nakamura, Koka (JP); Ryosuke Harada, Koka (JP); Koichiro Okamoto, Koka (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 620 days.

(21) Appl. No.: 13/819,867

(22) PCT Filed: Sep. 28, 2011

(86) PCT No.: PCT/JP2011/072292
§ 371 (c)(1),
(2), (4) Date: May 15, 2013

(87) PCT Pub. No.: WO2012/043681
PCT Pub. Date: Apr. 5, 2012

(65) Prior Publication Data
US 2013/0230733 A1  Sep. 5, 2013

(30) Foreign Application Priority Data

Sep. 28, 2010 (JP) ................................. 2010-217613
Sep. 28, 2010 (JP) ................................. 2010-217620

(51) Int. Cl.
*C08F 2/14* (2006.01)
*G02B 1/04* (2006.01)
(Continued)

(52) U.S. Cl.
CPC .................. *C08F 2/14* (2013.01); *B32B 5/16* (2013.01); *C08F 2/26* (2013.01); *G02B 1/04* (2013.01);
(Continued)

(58) Field of Classification Search
None
See application file for complete search history.

(56) References Cited

U.S. PATENT DOCUMENTS 5,147,937 A    9/1992  Frazza et al.
2006/0233972 A1* 10/2006  Muramatsu et al. ........ 428/1.31
(Continued)

FOREIGN PATENT DOCUMENTS

CN          1059913 A      4/1992
JP        61-252203 A     11/1986
(Continued)

OTHER PUBLICATIONS

Search report from International Patent Appl. No. PCT/JP2011/072292, dated Dec. 27, 2011.

*Primary Examiner* — Alexandre F Ferre
*Assistant Examiner* — Elaine M Vazquez
(74) *Attorney, Agent, or Firm* — Greenblum & Bernstein P.L.C.

(57) ABSTRACT

A process for producing resin particles includes a step in which a polymerizable mixture including a polymerizable monomer including at least one of a styrene-based monomer and a (meth)acrylic-based monomer, and a polymerization initiator is absorbed into seed particles in an aqueous medium, without using a dispersant, in the presence of an anionic surfactant not having a polyoxyethylene chain but having an alkyl group; and a step in which the polymerizable monomer is polymerized in an aqueous medium, without using a dispersant, in the presence of an anionic surfactant having a polyoxyethylene chain to thereby obtain resin particles. The resin particles include a resin derived from a polymerizable monomer including at least one of a styrene-based monomer and a (meth)acrylic-based monomer. The proportion by number of particles having a particle diameter (Continued)

in the range of from 80 to 120% of the volume-average particle diameter is 85% or more.

21 Claims, 4 Drawing Sheets

(51) Int. Cl.
  *G02B 5/02*   (2006.01)
  *B32B 5/16*   (2006.01)
  *C08F 2/26*   (2006.01)

(52) U.S. Cl.
  CPC ..... *G02B 5/0242* (2013.01); *Y10T 428/31786* (2015.04)

(56) References Cited

U.S. PATENT DOCUMENTS

| | | | |
|---|---|---|---|
| 2009/0036607 A1 | 2/2009 | Hirai et al. | |
| 2009/0203827 A1 | 8/2009 | Claassen et al. | |
| 2010/0171908 A1* | 7/2010 | Yoshihara | G02B 1/111 349/96 |

FOREIGN PATENT DOCUMENTS

| | | | |
|---|---|---|---|
| JP | 5-222204 A | 8/1993 | |
| JP | 8-134115 A | 5/1996 | |
| JP | 8-169907 A | 7/1996 | |
| JP | 8-259611 A | 10/1996 | |
| JP | 10-298250 A | 11/1998 | |
| JP | 2000-038455 | * 2/2000 | ............... C08F 2/44 |
| JP | 2000-290330 A | 10/2000 | |
| JP | 2005-220164 A | 8/2005 | |
| JP | 2005-220165 A | 8/2005 | |
| JP | 2005-281484 A | 10/2005 | |
| JP | 2006-22196 A | 1/2006 | |
| JP | 2009-242632 A | 10/2009 | |
| JP | 2009-541565 A | 11/2009 | |
| JP | 2010-116445 A | 5/2010 | |
| JP | 2010-138365 A | 6/2010 | |
| WO | 2006/093271 A1 | 9/2006 | |
| WO | 2010/104142 A1 | 9/2010 | |

* cited by examiner

RESIN PARTICLES AND PROCESS FOR PRODUCING SAME, ANTIGLARE FILM, LIGHT-DIFFUSING RESIN COMPOSITION, AND EXTERNAL PREPARATION

TECHNICAL FIELD

The present invention relates to resin particles and a process for producing the same, an anti-glare film, a light-diffusing resin composition, and an external preparation. More specifically, the present invention relates to resin particles having high monodispersity; an anti-glare film, a light-diffusing resin composition, and an external preparation using the same; and a process for producing resin particles having high monodispersity by a seed polymerization technique.

BACKGROUND TECHNOLOGY

Resin particles having a large particle diameter and high monodispersity are required as light-diffusing agents of light-diffuser films, light-diffuser plates, anti-glare films, and the like constituting display devices like liquid crystal TVs (televisions); additives for various mat materials; additives for paints; spacers; anti-blocking agents; chromatography fillers; and carriers for diagnostic reagents.

Seed polymerization techniques are known as processes for producing such resin particles. A seed polymerization technique is a process in which seed particles comprising a polymer having a uniform particle diameter are prepared in advance in an aqueous medium, and then a monomer is absorbed into the seed particles and polymerized (for example, Japanese Unexamined Patent Application, First Publication No. H08-169907; Patent Document 1). Absorption and polymerization of the monomer are normally repeated until resin particles having the desired particle diameter are obtained. In seed polymerization techniques, a water-soluble polymer dispersant having excellent dispersibility such as polyvinyl alcohol is mainly used as the dispersant.

However, it is easy for the water-soluble polymer dispersant such as polyvinyl alcohol to remain in resin particles. When the water-soluble polymer dispersant remains in resin particles, there is the problem of discoloration (yellowing) of resin particles by heat of the water-soluble polymer dispersant such as polyvinyl alcohol and deterioration over time. In order to prevent discoloration of resin particles by heat and the like, carrying out washing after polymerization in order to remove the water-soluble polymer dispersant such as polyvinyl alcohol can be considered. However, since it is difficult to completely remove the water-soluble polymer dispersant by washing, resin particles obtained using a water-soluble polymer dispersant include residual water-soluble polymer dispersant and thus yellowing when heated cannot be avoided. Also, when washing is carried out in order to remove the water-soluble polymer dispersant, there is the problem that productivity decreases since time for washing the resin particles is required.

Thus, a process for producing resin particles not using polyvinyl alcohol by using a specific surfactant has been suggested in Japanese Unexamined Patent Application, First Publication No. H10-298250 (Patent Document 2).

PRIOR ART DOCUMENTS

Patent Documents

Patent Document 1: Japanese Unexamined Patent Application, First Publication No. H08-169907

Patent Document 2: Japanese Unexamined Patent Application, First Publication No. H10-298250

SUMMARY OF THE INVENTION

Problem to be Solved by the Invention

However, in the production process disclosed in the above-described Patent Document 2, since there is a limit to the size of resin particles obtained by carrying out absorption and polymerization of the monomer in one stage, it is necessary to repeat absorption and polymerization of the monomer to obtain resin particles having a large particle diameter.

Also, according to examination by the inventors of the present invention, it is understood that when only an anionic (or non-ionic) surfactant having a polyoxyethylene chain is used like the production process disclosed in the above-described Patent Document 2, there are many fine particles and coarse particles, and thus resin particles having a uniform particle diameter (high monodispersity) cannot be obtained.

Accordingly, a production process that can provide good productivity of resin particles that are large even if the number of repetitions of absorption and polymerization of the monomer is reduced, that having high monodispersity, and for which discoloration when heated is suppressed; resin particles having high monodispersity and for which discoloration when heated is suppressed; and anti-glare films, light-diffusing resin compositions, and external preparations using the same are desired.

Means for Solving the Problem

Thus, in accordance with the present invention, a process for producing resin particles, the process comprising: a step in which a polymerizable mixture comprising a polymerizable monomer comprising at least one of a styrene-based monomer and a (meth)acrylic-based monomer, and a polymerization initiator is absorbed into seed particles in an aqueous medium, without using a dispersant, in the presence of an anionic surfactant not having a polyoxyethylene chain but having an alkyl group; and a step in which the polymerizable monomer is polymerized in an aqueous medium, without using a dispersant, in the presence of an anionic surfactant having a polyoxyethylene chain, to thereby obtain resin particles is provided.

In the specification of the present application, (meth)acrylic means acrylic or methacrylic and (meth)acrylate means acrylate or methacrylate.

Furthermore, in accordance with the present invention, resin particles that are obtained by the process mentioned above, comprise a resin derived from a polymerizable monomer comprising at least one of a styrene-based monomer and a (meth)acrylic-based monomer; and after having been heated for 2 hours in a 150° C. thermostatic chamber have a value of b*, as measured by a color and color-difference meter, in the range of from −1.0 to +2.0 are provided.

Here, the value of b* is a value obtained by carrying out chromaticity measurement in an L*a*b* color system in accordance with JIS Z 8722. The larger the value of b* is on the positive (+) side, the more the degree of yellowness increases.

Furthermore, in accordance with the present invention, resin particles comprising a resin derived from a monomer comprising at least one of a styrene-based monomer and a (meth)acrylic-based monomer, wherein the proportion by number of particles having a particle diameter in the range of from 80 to 120% of the volume-average particle diameter is 83% or more, and the resin particles after having been heated in a 150° C. thermostatic chamber for 2 hours have a value of b*, as measured with a color and color-difference meter, in the range of from −1.0 to +2.0 are provided.

Furthermore, in accordance with the present invention, an anti-glare film obtained by coating a coating composition comprising the resin particles of the present invention on a transparent base film, a light-diffusing resin composition comprising resin particles of the present invention, and an external preparation comprising resin particles of the present invention are provided.

Effects of the Invention

In accordance with the production process of the present invention, since a polymerizable mixture is absorbed into seed particles in the presence of an anionic surfactant not having a polyoxyethylene chain but having an alkyl group and the polymerizable monomer is polymerized in the presence of an anionic surfactant having a polyoxyethylene chain, resin particles having a uniform particle diameter (high mondispersity) can be obtained in good productivity by suppressing the generation of fine particles and coarse particles. Also, since the production process of the present invention does not use a water-soluble polymer dispersant (polyvinyl alcohol or the like), yellowing of resin particles when heated can be suppressed compared to resin particles obtained using a water-soluble polymer dispersant. For example, the value of b* measured by a color and color-difference meter after heating for 2 hours in a 150° C. thermostatic chamber can be suppressed to in the range of from −1.0 to +2.0. Also, since the production process of the present invention does not use an inorganic dispersant, the remaining of a metal portion (magnesium or the like) exceeding 10 ppm on the resin particle surface can be avoided. For this reason, when a product is produced by mixing the resin particles with another substance, deterioration in properties (for example, anti-glare property of anti-glare films) of the product as a result of the occurrence of resin particle aggregation by ionic bonding caused by the metal portion can be avoided. Also, since the production process of the present invention does not use a macromonomer as a dispersant, generation of a white turbidity in the resin particles by partial crystallization of the macromonomer can be avoided.

Also, since the proportion by number of particles having a particle diameter in the range of from 80 to 120% of the volume-average particle diameter is 83% or more, the resin particles of the present invention are resin particles in which the proportion by number of fine particles having a particle diameter smaller than 80% of the volume-average particle diameter and the proportion by number of coarse particles having a particle diameter larger than 120% of the volume-average particle diameter are reduced. Accordingly, properties such as an anti-glare property, light diffusion property, and a matting property can be improved when the resins particles of the present invention are mixed with another substance. Also, since the resin particles of the present invention have a value of b* measured by a color and color-difference meter after heating for 2 hours in a 150° C. thermostatic chamber in the range of from −1.0 to +2.0, yellowing of the resin particles when heated can be suppressed. Accordingly, the resin particles of the present invention can suppress the yellowing of products, particularly for uses involving heating when producing products by combining resin particles with another substance, for example, uses in which, after a composition is produced by combining resin particles with a base resin, the composition is applied and dried by heating (particularly uses of producing anti-glare films by applying the composition to the surface of a transparent plastic film, which is the base material, and drying by heating), uses in which, after a composition is produced by combining resin particles with a base resin, the composition is molded by heating and the like. Suppressing yellowing of products is particularly important when the products using resin particles are optical components such as light-diffuser films, light-diffuser plates, anti-glare films.

As mentioned above, in accordance with the present invention, resin particles having high monodispersity and for which discoloration when heated is suppressed can be provided.

Furthermore, since the anti-glare film of the present invention is obtained by coating a coating composition comprising resin particles of the present invention on a transparent base film, it has an excellent anti-glare property and discoloration is suppressed.

Furthermore, since the light-diffusing resin composition of the present invention comprises resin particles of the present invention, it has excellent light diffusion property and discoloration is suppressed.

Furthermore, since the external preparation of the present invention comprises resin particles of the present invention, it has good smoothness.

BEST MODE FOR CARRYING OUT THE INVENTION

Figure 1:
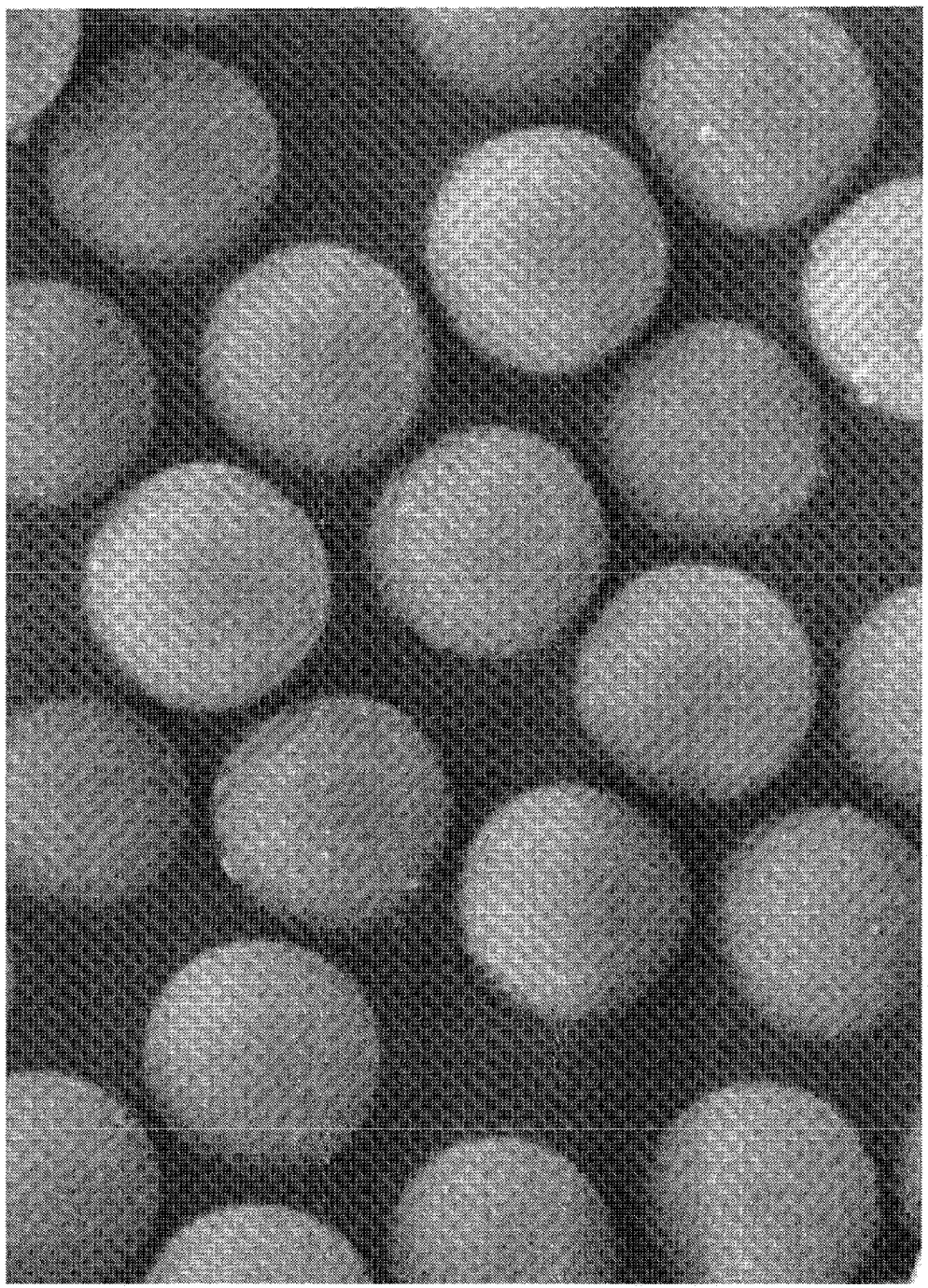
FIG. 1 is a scanning electron micrograph of the polymer particles obtained in Example 1.

The production process of the present invention relates to a process for producing resin particles by a seed polymerization technique, the process comprising a step in which a polymerizable mixture comprising a polymerizable monomer and a polymerization initiator is absorbed into seed particles in an aqueous medium in the presence of an anionic surfactant (hereinafter, referred to as "absorption step") and a step in which resin particles are obtained by polymerizing the polymerizable monomer in an aqueous medium in the presence of an anionic surfactant (hereinafter, referred to as "polymerization step"). In particular, the process for producing resin particles of the present invention, without using a dispersant in either the absorption step or the polymerization step, uses a different anionic surfactant in the absorption step and the polymerization step, and uses a polymerizable monomer comprising at least one of a styrene-based monomer and a (meth)acrylic-based monomer. The process for producing resin particles of the present invention uses an anionic surfactant not having a polyoxyethylene chain but having an alkyl group in the absorption step and uses an anionic surfactant having a polyoxyethylene chain in the polymerization step.

The above-described dispersants are also called dispersion stabilizers. In the present specification, "dispersant" is defined as a poorly water-soluble inorganic compound or a polymer substance having a weight-average molecular weight of 8,000 or more that stabilizes the state of the polymerizable mixture in the aqueous medium. The above-described dispersants are water-soluble polymer dispersants, inorganic dispersants, macromonomers (polymer compounds having a polymerizable functional group), and the like. The above-described water-soluble polymer dispersants are polyvinyl alcohol, polycarboxylic acid, celluloses (hydroxyethyl cellulose, carboxymethyl cellulose, and the like), polyvinyl pyrrolidone, and the like. The above-described inorganic dispersants are pyrophosphates such as double-decomposed magnesium pyrophosphate (magnesium pyrophosphate produced by a double decomposition production technique), calcium pyrophosphate, aluminum pyrophosphate, and zinc pyrophosphate; phosphates such as calcium phosphate, magnesium phosphate, aluminum phosphate, and zinc phosphate; metal carbonates such as calcium carbonate and magnesium carbonate; metal hydroxides such as calcium hydroxide, magnesium hydroxide, and aluminum hydroxide; and poorly water-soluble inorganic compounds such as calcium metasilicate, calcium sulfate, barium sulfate, and colloidal silica. As the above-described macromonomers, for example, copolymers of a monofunctional monomer having a hydrophilic group such as a carboxyl group and a monofunctional monomer not having a hydrophilic group can be mentioned. As such copolymers, copolymers of a (meth)acrylate ester and (meth)acrylic acid can be mentioned. Here, "monofunctional" means having one polymerizable alkenyl group (vinyl group in the broad sense) in one molecule.

Also, in the production process of the present invention, the above-described anionic surfactant not having a polyoxyethylene chain but having an alkyl group is preferably at least one compound selected from the group consisting of alkyl sulfosuccinates, alkyl sulfonates, and alkyl sulfoacetates, and the anionic surfactant having a polyoxyethylene chain is preferably at least one compound selected from polyoxyethylene aryl ether phosphates, polyoxyethylene alkyl ether phosphates, polyoxyethylene alkyl ether sulfates, polyoxyethylene aryl ether sulfates, and polyoxyethylene alkyl sulfosuccinates. In such case, resin particles having higher monodispersity and better suppression of yellowing when heated can be provided.

Furthermore, in the production process of the present invention, the above-described anionic surfactant not having a polyoxyethylene chain but having an alkyl group is preferably a dialkyl sulfosuccinate, and the above-described anionic surfactant having a polyoxyethylene chain is preferably at least one of a polyoxyethylene alkyl ether phosphate and a polyoxyethylene aryl ether sulfate. In such case, resin particles having higher monodispersity and better suppression of yellowing when heated can be provided.

Also, in the production process of the present invention, it is preferable to use 0.1 to 10 parts by weight of the anionic surfactant not having a polyoxyethylene chain but having an alkyl group based on 100 parts by weight of the polymerizable monomer and to use 0.1 to 10 parts by weight of the anionic surfactant having a polyoxyethylene chain based on 100 parts by weight of the above-described polymerizable monomer. In the production process of the present invention, when the above-described polymerizable monomer includes a (meth)acrylic-based monomer (in particular, when the above-described polymerizable monomer includes a (meth) acrylic-based monomer having a solubility in water (20° C.) of 1.5% by weight or less), it is preferable to use 0.1 to 10 parts by weight of the above-described anionic surfactant not having a polyoxyethylene chain but having an alkyl group based on 100 parts by weight of the above-described (meth)acrylic-based monomer and to use 0.1 to 10 parts by weight of the above-described anionic surfactant having a polyoxyethylene chain based on 100 parts by weight of the above-described (meth)acrylic-based monomer. In such cases, resin particles having higher monodispersity and better suppression of yellowing when heated can be provided.

Furthermore, in the production process of the present invention, the above-described anionic surfactant not having a polyoxyethylene chain but having an alkyl group preferably has a constitution in which the total number of carbons of all alkyl groups constituting one molecule of the anionic surfactant is 10 to 40 and the number of all alkyl groups constituting one molecule of the anionic surfactant is 1 to 5. In such case, resin particles having higher monodispersity and better suppression of yellowing when heated can be provided.

Also, in the production process of the present invention, when the above-described polymerizable monomer includes a styrene-based monomer, the above-described styrene-based monomer is preferably at least one compound selected from the group consisting of styrene, p-methylstyrene, p-chlorostyrene, and α-methylstyrene. In such case, resin particles having higher monodispersity and better suppression of yellowing when heated can be provided.

Also, in the production process of the present invention, when the above-described polymerizable monomer includes a (meth)acrylic-based monomer, it is preferable that the above-described (meth)acrylic-based monomer is an alkyl (meth)acrylate and the number of carbons of the above-described alkyl is from 2 to 12. In such case, resin particles having higher monodispersity and better suppression of yellowing when heated can be provided.

Furthermore, in the production process of the present invention, when the above-described polymerizable monomer includes a styrene-based monomer, it is preferable that 30 to 300 parts by weight of the above-described polymerizable mixture is absorbed based on 1 part by weight of seed particles. In such case, resin particles having higher monodispersity and better suppression of yellowing when heated can be provided by a smaller number of absorption steps.

Furthermore, in the production process of the present invention, when the above-described polymerizable monomer includes a (meth)acrylic-based monomer (in particular, when the above-described polymerizable monomer includes a (meth)acrylic-based monomer having a solubility in water (20° C.) of 1.5% by weight or less), it is preferable that 30 to 500 parts by weight of the above-described polymerizable mixture is absorbed based on 1 part by weight of seed particles. In such case, resin particles having higher monodispersity and better suppression of yellowing when heated can be provided by a smaller number of absorption steps.

(1) Anionic Surfactant
(a) Anionic Surfactant Used in Absorption Step

The anionic surfactant used in the absorption step is an anionic surfactant not having a polyoxyethylene chain but having an alkyl group. This anionic surfactant has the main role of maintaining the state in which droplets of the polymerizable mixture comprising a polymerizable monomer comprising at least one of a styrene-based monomer and a (meth)acrylic-based monomer, and a polymerization initiator are stably dispersed as is in a small form in the aqueous medium. The inventors consider that maintenance of the stabilized dispersion state is achieved by the alkyl group in the above-described anionic surfactant. That is, the inventors consider that the dispersion state of the droplet can be stably maintained by the alkyl group of the above-described anionic surfactant facing towards the droplet side of the above-described polymerizable mixture and parts other than the alkyl group in the above-described anionic surfactant facing toward the aqueous medium side. Furthermore, the inventors consider that there is also the effect that absorption of the above-described polymerizable mixture into the seed particles increases (swelling ratio of the seed particles by absorption of the polymerizable mixture increases) by stably maintaining the dispersion state.

The position of the above-described alkyl group is preferably at a terminal in the molecule of the above-described anionic surfactant. By the position of the above-described alkyl group being at a terminal, the dispersion state of the above-described droplets can be more stably maintained. The number of carbons constituting an alkyl group, expressed as the total number of carbons of all alkyl groups in one molecule of the above-described anionic surfactant, is preferably in the range of from 10 to 40. By the total number of carbons of all alkyl groups in one molecule of the above-described anionic surfactant being in this range, the dispersion state of the above-described droplets can be more stably maintained. More preferably, the total number of carbons of all alkyl groups in one molecule of the above-described anionic surfactant is in the range of from 10 to 30. The number of alkyl groups in one molecule of the above-described anionic surfactant is preferably in the range of from 1 to 5. By being in this range, the dispersion state of the above-described droplets can be more stably maintained. The number of carbons constituting one alkyl group can be increased if the number of alkyl groups is small and can be decreased if the number of alkyl groups is large. Accordingly, the value of number of alkyl groups×number of carbons is preferably in the range of from 10 to 150.

Here, as specific alkyl groups, alkyl groups having a number of carbons of from 6 to 20 (hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group or icosyl group) and the like can be mentioned. These alkyl groups may be linear or branched.

Furthermore, specifically, the above-described anionic surfactant is preferably at least one compound selected from the group consisting of alkyl sulfosuccinates, alkyl sulfonates, alkyl sulfoacetates, α-olefin sulfonates, and acyl sulfonates, and more preferably at least one compound selected from the group consisting of alkyl sulfosuccinates, alkyl sulfonates, and alkyl sulfoacetates. As these anionic surfactants, metal salts such as sodium salts, potassium salts, and calcium salts; ammonium salts; and the like can be used.

The at least one compound selected from the above-described group is preferably an alkyl sulfosuccinate and more preferably a dialkyl sulfosuccinate. In particular, as the above-described dialkyl sulfosuccinate, sodium dioctyl sulfosuccinate, sodium di-2-ethylhexyl sulfosuccinate, and the like can be mentioned.

The above-described anionic surfactant may be an alkylbenzene sulfonate such as sodium dodecylbenzene sulfonate. The above-described anionic surfactant may be used alone or by combining two or more thereof.

The used amount of the above-described anionic surfactant is preferably in the range of from 0.1 to 10 parts by weight based on 100 parts by weight of the above-described polymerizable monomer. When the used amount of the above-described anionic surfactant is in this range, resin particles in which the generation of fine particles and coarse particles has been further suppressed can be obtained. A more preferable used amount of the anionic surfactant is from 0.1 to 5 parts by weight based on 100 parts by weight of the above-described polymerizable monomer.

(b) Anionic Surfactant Used in Polymerization Step

The anionic surfactant used in the polymerization step is an anionic surfactant having a polyoxyethylene chain. This anionic surfactant has the main role of maintaining the state in which the seed particles which have absorbed the polymerizable mixture comprising a polymerizable monomer comprising at least one of a styrene-based monomer and a (meth)acrylic-based monomer, and a polymerization initiator are stably dispersed as is without cohering together in the aqueous medium. The inventors consider that maintenance of the stabilized dispersion state is achieved by the polyoxyethylene chain in the above-described anionic surfactant. That is, the inventors consider that by droplets of the above-described polymerizable mixture (monomer droplets) becoming stable by the polyoxyethylene chain in the above-described surfactant widely adsorbing to the droplets of the above-described polymerizable mixture, the dispersion state of the seed particles which have absorbed the polymerizable mixture can be stably maintained.

The above-described polyoxyethylene chain preferably has a repetition number of from 1 to 30. By the repetition number being in this range, the dispersion state of the seed particles which have absorbed the polymerizable mixture can be stably maintained. The repetition number is more preferably in the range of from 1 to 20.

The above-described anionic surfactant having a polyoxyethylene chain may be a aliphatic-based anionic surfactant or may be an aromatic-based anionic surfactant.

A surfactant including a phosphate, a sulfate, a sulfosuccinate, or the like in the molecular structure can be used as the above-described anionic surfactant having a polyoxyethylene chain. As such anionic surfactant, metal salts such as sodium salts, potassium salts, and calcium salts; ammonium salts; and the like can be used.

Furthermore, specifically, the above-described anionic surfactant having a polyoxyethylene chain is preferably at least one compound selected from polyoxyethylene aryl ether phosphates, polyoxyethylene alkyl ether phosphates, polyoxyethylene alkyl ether sulfates, polyoxyethylene aryl ether sulfates, and polyoxyethylene alkyl sulfosuccinates. As the aryl group included in the polyoxyethylene aryl ether phosphates and the polyoxyethylene aryl ether sulfates, phenyl groups, styrenated phenyl groups, tolyl groups, xylyl groups, and the like can be mentioned. As the alkyl group included in the polyoxyethylene alkyl ether phosphates, the polyoxyethylene alkyl ether sulfates, and the polyoxyethylene alkyl sulfosuccinates, alkyl groups having a number of carbons of from 1 to 10 and the like can be mentioned.

Various types of the above-described anionic surfactant having a polyoxyethylene chain are on the market. As the above-described polyoxyethylene aryl ether phosphates, for example, anionic surfactant agents on the market as AL and AL12H of the PLYSURF® Series from Dai-ichi Kogyo Seiyaku Co., Ltd. (both are polyoxyethylene styrenated phenyl ether phosphate esters) can be used.

As the above-described polyoxyethylene alkyl ether phosphates, for example, anionic surfactants marketed as A212C (polyoxyethylene tridecyl ether phosphate), A215C (polyoxyethylene tridecyl ether phosphate), A208F (polyoxyethylene alkyl (C8) ether phosphate ester), M208F (polyoxyethylene alkyl (C8) ether phosphate ester.monoethanol amine salt), A208N (polyoxyethylene alkyl (C12, 13) ether phosphate ester), A208B (polyoxyethylene lauryl ether phosphate ester), A210B, A219B, DB-01, and A210D of the PLYSURF® Series from Dai-ichi Kogyo Seiyaku Co., Ltd.; anionic surfactants marketed as LO-529 (polyoxyethylene tridecyl ether phosphate), RB-410, RL210, RS610, ML-220, RD-510Y, RD-720N, RL-310, RS-410, RS-710, ED-200, LB-400, LS-500, ML-240, RD-720, RP-710, GB-520, LP-700, and RA-600 of the Phosphanol® Series from Toho Chemical Industry Co., Ltd. can be used.

As the above-described polyoxyethylene alkyl ether sulfates, for example, anionic surfactants marketed as XJ-630S, XJ-16, PS-06, PS-15, 330T, TM-07, 227L, 325L, LA-10, LA-12, LA-16, 325SM, 08E, 18E, and W-2320 of the HITENOL® Series from Dai-ichi Kogyo Seiyaku Co., Ltd. can be used.

As the above-described polyoxyethylene aryl ether sulfates, for example, anionic surfactants marketed as NF-08, NF-0825, NF-13, NF-17 (all are polyoxyethylene styrenated phenyl ether ammonium sulfates) of the HITENOL® Series from Dai-ichi Kogyo Seiyaku Co., Ltd. can be used.

As the above-described polyoxyethylene alkyl sulfosuccinates, for example, anionic surfactants marketed as ECL-30S, ECL-45, LS, L30, S-70 of the NEOHITENOL® Series from Dai-ichi Kogyo Seiyaku Co., Ltd. can be used.

The above-described anionic surfactant having a polyoxyethylene chain, among the above-described specific examples, is preferably at least one of a polyoxyethylene alkyl ether phosphate (for example, "Phosphanol® LO-529) and a polyoxyethylene aryl ether sulfate (for example, "HITENOL® NF-17"), and more preferably at least one of a polyoxyethylene tridecyl ether phosphate and a polyoxyethylene styrenated phenyl ether phosphate.

The above-described anionic surfactant having a polyoxyethylene chain may be used alone or by combining two or more thereof.

The used amount of the above-described anionic surfactant having a polyoxyethylene chain is preferably in the range of from 0.1 to 10 parts by weight based on 100 parts by weight of the polymerizable monomer. When the used amount of the above-described anionic surfactant having a polyoxyethylene chain is in this range, resin particles in which the generation of fine particles and coarse particles has been further suppressed can be obtained. A more preferable used amount of the anionic surfactant is in the range of from 0.1 to 5 parts by weight based on 100 parts by weight of the polymerizable monomer.

(2) Polymerizable Monomer
(a) Styrene-Based Monomer

The above-described styrene-based monomer is a monofunctional monomer containing styrene or a styrene backbone. As the above-described styrene-based monomer, monofunctional styrene-based monomers such as styrene, p-methylstyrene, p-chlorostyrene, and α-methylstyrene can be mentioned. All of these styrene-based monomers have a solubility of 1.5% by weight or less in water (20° C.).

(b) (Meth)acrylic-Based Monomer

The above-described (meth)acrylic-based monomer is a monofunctional (meth)acrylate ester. The above-described (meth)acrylic-based monomer is preferably a (meth)acrylic-based monomer having a solubility (when the total amount of water and the (meth)acrylic-based monomer is 100% by weight) of 1.5% by weight or less in water (20° C.). When the solubility of the (meth)acrylic-based monomer is more than 1.5% by weight in water (20° C.), the resin particles can aggregate. The inventors speculate that the reason therefor is a follows. That is, when the solubility of the (meth)acrylic-based monomer is more than 1.5% by weight in water (20° C.), at the time of absorption of the (meth)acrylic-based monomer into the seed particles and the time of polymerization of the (meth)acrylic-based monomer, dissolution of the (meth)acrylic-based monomer in the aqueous medium occurs. The inventors speculate that the dissolved (meth)acrylic-based monomer plays a role in aggregation of resin particles when such is polymerized.

As a (meth)acrylic-based monomer having a solubility of 1.5% by weight or less in water (20° C.), both a aliphatic-based (meth)acrylic-based monomer ((meth)acrylic-based monomer not having an aromatic hydrocarbon group or a alicyclic hydrocarbon group) and an aromatic-based (meth)acrylic-based monomer ((meth)acrylic-based monomer having an aromatic hydrocarbon group) can be used. Here, a aliphatic-based (meth)acrylic-based monomer is preferable as the (meth)acrylic-based monomer from the viewpoint of absorption of the polymerizable mixture to the seed particles being good. Furthermore, the (meth)acrylic-based monomer having a solubility of 1.5% by weight or less in water (20° C.) is preferably an ester of an alkyl alcohol having a number of carbons of from 2 to 12 and (meth)acrylic acid.

As specific examples of the above-described (meth)acrylic-based monomer having a solubility of 1.5% by weight or less in water (20° C.), alkyl methacrylate esters such as ethyl methacrylate, n-propyl methacrylate, isopropyl methacrylate, n-butyl methacrylate, isobutyl methacrylate, sec-butyl methacrylate, tert-butyl methacrylate, and lauryl methacrylate; alkyl acrylate esters such as ethyl acrylate, n-propyl acrylate, isopropyl acrylate, n-butyl acrylate, isobutyl acrylate, sec-butyl acrylate, tert-butyl acrylate, and lauryl acrylate; and the like can be mentioned.

The above-described (meth)acrylic-based monomer may be an (meth)acrylic-based monomer having a solubility of more than 1.5% in water (20° C.). As such (meth)acrylic-based monomer, both aliphatic-based (meth)acrylic-based monomers and aromatic-based (meth)acrylic-based monomers can be used, and methyl acrylate, methyl methacrylate, diethylaminoethyl methacrylate, ethylene glycol mono(meth)acrylate, polyethylene glycol mono(meth)acrylate, and the like can be mentioned.

Here, the solubility in water (20° C.) of methyl methacrylate, ethyl methacrylate, n-butyl methacrylate, isobutyl methacrylate, tert-butyl methacrylate, and lauryl methacrylate is shown in Table 1.

TABLE 1

| Monomer Species | Solubility in Water (20° C., % by weight) |
|---|---|
| Methyl methacrylate | 1.72 |
| Ethyl methacrylate | 0.48 |
| n-butyl methacrylate | 0.04 |
| Isobutyl methacrylate | 0.04 |
| tert-butyl methyacrylate | 0.05 |
| Lauryl methacrylate | 0.01 or less |

When the above-described polymerizable monomer includes both a styrene-based monomer and a (meth)acrylic-based monomer, the used amount of the above-described styrene-based monomer may be 50% by weight or more of the above-described polymerizable monomer and may be less than 50% by weight of the above-described polymerizable monomer.

(c) Other Monomers

Other monomers in addition to the styrene-based monomer and the above-described (meth)acrylic-based monomer may be used in the above-described polymerizable monomer depending on the properties required of the resin particles.

As other monomers, (meth)acrylic acid; multifunctional styrene-based monomers like divinyl benzene; multifunctional (meth)acrylic-based monomers such as ethylene glycol di(meth)acrylate, triethylene glycol di(meth)acrylate, tetraethylene glycol di(meth)acrylate, trimethylolpropane tri(meth)acrylate, pentaerythritol tri(meth)acrylate, 1,1,1-trishydroxymethylethane diacrylate, 1,1,1-trishydroxymethylethane triacrylate, 1,1,1-trishydroxymethylpropane triacrylate; vinyl-based monomers such as methyl vinyl ether, ethyl vinyl ether, vinyl acetate, vinyl butyrate, N-methylacrylamide, M-ethylacrylamide, N-methylmethacrylamide, N-ethylmethacrylamide, acrylonitrile, and methacrylonitrile; and the like can be mentioned. The above-described multifunctional styrene-based monomer is a multifunctional monomer containing styrene or a styrene backbone. Here, "multifunctional" means having two or more polymerizable alkenyl groups in one molecule. The above-described multifunctional (meth)acrylic-based monomer is a multifunctional (meth)acrylate ester.

From the viewpoint of imparting solvent resistance to the resin particles, the above-described polymerizable monomer preferably includes the above-described multifunctional (meth)acrylic-based monomer. The used amount of the multifunctional (meth)acrylic-based monomer can be less than 50% by weight of the above-described polymerizable monomer. From the viewpoint of imparting solvent resistance to the resin particles, the used amount of the above-described multifunctional (meth)acrylic-based monomer is preferably in the range of from 5 to 30% by weight of the polymerizable monomer.

(3) Polymerization Initiator

As the above-described polymerization initiator, there are particularly no limitations and any known polymerization initiator can be used. As the polymerization initiator, for example, organic peroxides such as benzoyl peroxide, lauroyl peroxide, ortho-chlorobenzoyl peroxide, ortho-methoxybenzoyl peroxide, 3,5,5-trimethylhexanoyl peroxide, t-butylperoxy-2-ethylhexanoate, and di-tert-butyl peroxide; azo-based compounds such as 2,2'-azobisisobutyronitrile, 1,1'-azobiscyclohexane carbonitrile, 2,2'-azobis(2,4-dimethylvaleronitrile); and the like can be mentioned. The above-described polymerization initiator is preferably used in the range of from 0.1 to 1 parts by weight based on 100 parts by weight of the above-described polymerizable monomer.

(4) Aqueous Medium

As the above-described aqueous medium, water and a mixed medium of water and a water-soluble solvent (for example, lower alcohol (alcohol having a number of carbons of 5 or less) can be mentioned.

(5) Seed Particles

As the above-described seed particles, there are particularly no limitations, and vinyl-based resin particles such as acrylic-based resin particles and styrene-based resin particles can be mentioned.

As the above-described acrylic-based resin particles, particles derived from a (meth)acrylic-based monomer can be mentioned. As (meth)acrylic-based monomers, acrylic acid; methyl acrylate; ethyl acrylate; n-butyl acrylate; isobutyl acrylate; tert-butyl acrylate; dodecyl acrylate; stearyl acrylate; 2-ethylhexyl acrylate; tetrahydrofurfuryl acrylate; diethylaminoethyl acrylate; methacrylic acid; methyl methacrylate; ethyl methacrylate; propyl methacrylate; n-butyl methacrylate; isobutyl methacrylate; tert-butyl methacrylate; n-octyl methacrylate; dodecyl methacrylate; 2-ethylhexyl methacrylate; stearyl methacrylate; diethylaminoethyl methacrylate; glycol esters of (meth)acrylic acid such as ethylene glycol mono(meth)acrylate and polyethylene glycol mono(meth)acrylate; and the like can be mentioned. These monomers may be used alone or in combination of two or more thereof.

Other monomers may be added to the above-described (meth)acrylic-based monomer. As other monomers, alkyl vinyl ethers such as methyl vinyl ether and ethyl vinyl ether; vinyl esters such as vinyl acetate and vinyl butyrate; N-alkyl-substituted (meth)acrylamides such as N-methylacrylamide, N-ethylacrylamide, N-methylmethacrylamide, and N-ethylmethacrylamide; nitriles such as acrylonitrile, and methacrylonitrile; multifunctional monomers such as divinyl benzene, ethylene glycol di(meth)acrylate, and trimethylolpropane triacrylate; and styrene-based monomers such as styrene, p-methylstyrene, p-chlorostyrene, chloromethylstyrene, and α-methylstyrene can be mentioned. These other monomers may be used alone or in combination of two or more thereof.

As styrene-based particles, particles derived from styrene-based monomers such as styrene, p-methylstyrene, p-chlorostyrene, chloromethylstyrene, and α-methylstyrene can be mentioned. These styrene-based monomers, may be used alone or in combination of two or more thereof.

Other monomers may be added to the above-described styrene-based monomer. As other monomers, glycol esters of (meth)acrylic acid such as ethylene glycol mono(meth)acrylate and polyethylene glycol mono(meth)acrylate; alkyl vinyl ethers such as methyl vinyl ether, and ethyl vinyl ether; vinyl esters such as vinyl acetate and vinyl butyrate; N-alkyl-substituted (meth)acrylamides such as N-methylacrylamide, N-ethylacrylamide, N-methylmethacrylamide, N-ethylmethacrylamide; nitriles such as acrylonitrile and methacrylonitrile; multifunctional monomers such as divinyl benzene, ethylene glycol di(meth)acrylate, and trimethylolpropane triacrylate; and meth(acrylate)-based monomers ((meth)acrylic-based monomers other than glycol esters of (meth)acrylic acid) such as acrylic acid, methyl acrylate, ethyl acrylate, n-butyl acrylate, isobutyl acrylate, tert-butyl acrylate, dodecyl acrylate, stearyl acrylate, 2-ethylhexyl acrylate, tetrahydrofurfuryl acrylate, diethylaminoethyl acrylate, methacrylic acid, methyl methacrylate, ethyl methacrylate, propyl methacrylate, n-butyl methacrylate, isobutyl methacrylate, tert-butyl methacrylate, n-octyl methacrylate, dodecyl methacrylate, 2-ethylhexyl methacrylate, stearyl methacrylate, and diethylamino ethyl methacrylate; and the like can be mentioned. These may be used alone or in combination of two or more thereof.

The above-described seed particles are preferably acrylic-based resin particles or styrene-based resin particles. The above-described seed particles are preferably non-crosslinked resin particles and more preferably non-crosslinked (meth)acrylic-based resin particles or styrene-based resin particles.

The volume-average particle diameter of the above-described particles can be appropriately adjusted according to conditions such as the amount of polymerizable monomer absorbed into the seed particles and the particle diameter of the desired resin particles, and is preferably in the range of from 0.1 to 10 μm.

The above-described seed particles can be acquired by polymerizing a vinyl-based monomer (compound having at least one polymerizable alkenyl group in one molecule) such as a (meth)acrylic-based monomer and a styrene-based monomer by a known polymerization method such as, for example, an emulsion polymerization technique, a soap-free emulsion polymerization technique (emulsion polymerization technique not using a surfactant), a dispersion polymerization technique, or a seed polymerization technique.

The above-described seed particles may be isolated from the polymerization system or may be used in the production of resin particles as is without being isolated.

The seed polymerization may be carried out by repeating multiple stages. That is, the seed polymerization, for example, may include a first stage polymerization in which second seed particles are obtained by absorbing a monomer mixture into first particles obtained by polymerization which is not seed polymerization, and a final stage seed polymerization in which the crosslinked resin particles of the present invention are obtained by absorbing a monomer mixture into the second seed particles and polymerizing. Also, the seed polymerization may include, the above-described first stage seed polymerization, a second stage polymerization in which third seed particles are obtained by absorbing a monomer mixture into the second seed particles and polymerizing, . . . , and a final step seed polymerization in which the crosslinked resin particles of the present invention are obtained. The method of carrying out seed polymerization by repeating multiple stages is suitable for when the particle diameter of resin particles is to be increased.

Although the polymerization of the vinyl-based monomer in order to obtain the seed particles used in the first stage seed polymerization can be carried out similar to the polymerization of the above-described polymerizable monomer to obtain the resin particles of the present invention, such preferably does not use a surfactant. That is, a soap-free emulsion polymerization technique is most preferable as the polymerization method of the vinyl-based monomer in order to obtain the seed particles used in the first stage seed polymerization. In contrast, the polymerization of the vinyl-based monomer in order to obtain the seed particles (second and thereafter seed particles) used in the second stage and thereafter polymerizations is the same seed polymerization as the final stage seed polymerization to obtain the resin particles of the present invention and preferably uses a surfactant.

In the polymerization of the vinyl-based monomer in order to obtain seed particles, a molecular weight modifier can be added. As the above-described molecular weight modifier, for example, mercaptans such as n-octyl mercaptan(1-octanethiol), n-dodecyl mercaptan, and tert-dodecyl mercaptan; terpenes such as γ-terpinene and dipentene; halogenated hydrocarbons such as chloroform and carbon tetrachloride; α-methylstyrene dimer; and the like can be mentioned.

(6) Seed Polymerization Technique

For the process of the present invention, known seed polymerization techniques may be referred to. Although the general process of seed polymerization techniques is mentioned below, it is not limited to this process.

Firstly, seed particles are added to an emulsion formed from a polymerizable mixture and an aqueous medium. The emulsion can be prepared by a known process. For example, the emulsion can be obtained by adding the polymerizable mixture to the aqueous medium and dispersing using a fine emulsification device such as a homogenizer, an ultrasonic processor, or a high-pressure homogenizer (Nanomizer®).

The polymerization initiator may be dispersed in the aqueous medium after mixing in advance in the polymerizable monomer or may be mixed by separately dispersing the polymerization initiator and the polymerizable monomer in the aqueous medium. The particle diameter of droplets of the polymerizable mixture in the obtained emulsion is preferably smaller than the seed particles since the polymerizable mixture will be efficiently absorbed into the seed particles thereby.

The seed particles may be directly added to the emulsion or may be added in the form of seed particles dispersed in an aqueous medium.

After addition of the seed particles to the emulsion, the polymerizable mixture is absorbed into the seed particles. The absorption normally can be carried out by stirring the emulsion for 1 to 12 hours at room temperature (about 20° C.) after addition of the seed particles. Also, absorption may be promoted by heating the emulsion to about 30 to 50° C.

The seed particles swell by absorption of the polymerizable mixture. In the process of the present invention, the amount of the polymerizable mixture absorbed into the seed particles in one absorption step can be larger than the above-described prior art. For example, the used amount of the polymerizable mixture can be 30 parts by weight or more based on 1 part by weight of the seed particles. When the above-described polymerizable monomer includes a styrene-based monomer, the used amount of the above-described polymerizable mixture is preferably in the range of from 30 to 300 parts by weight, and more preferably in the range of from 30 to 200 parts by weight, based on 1 part by weight of the seed particles. When the above-described polymerizable monomer includes a (meth)acrylic-based monomer, the used amount of the above-described polymerizable mixture is preferably in the range of from 30 to 500 parts by weight, and more preferably in the range of from 40 to 300 parts by weight, based on 1 part by weight of the seed particles. When the used amount of the above-described polymerizable mixture is smaller than the minimum value in the above-described numerical ranges, productivity decreases by the increase in the particle diameter by polymerization becoming smaller. When the used amount of the above-described polymerizable mixture is larger than the maximum value in the above-described numerical ranges, the above-described polymerizable mixture cannot be completely absorbed into the seed particles and independently suspension polymerizes in the aqueous medium to form anomalous particles. The completion of absorption of the above-described polymerizable mixture into the seed particles can be determined by confirming expansion of the particle diameter by observation with an optical microscope.

Next, the resin particles are obtained by polymerizing the polymerizable monomer absorbed into the seed particles.

The polymerization temperature can be appropriately selected according to the type of polymerizable monomer and polymerization initiator. The polymerization temperature is preferably in the range of from 25 to 110° C. and more preferably in the range of from 50 to 100° C. The polymerization reaction is preferably carried out by increasing the temperature after the polymerizable mixture has been completely absorbed into the seed particles. After completion of polymerization, the resin particles are preferably isolated by removing the aqueous medium from the suspension including the resin particles by pressurized filtering, suction filtering, or the like, removing surfactant on the resin particles by washing with water or a solvent, and then drying.

Also, in order to suppress the generation of emulsified particles in the aqueous system, a water-soluble polymerization inhibitor such as a nitrite, a sulfite, hydroquinone, an ascorbic acid, an aqueous vitamin B, citric acid, a polyphenol, or the like may be added to the polymerization reaction system.

(7) Resin Particles

According to the process of the present invention, resin particles with good monodispersity in good productivity in which the generation of small particles and coarse particles derived from the monomer, and particle aggregates are suppressed can be obtained.

According to the process of the present invention, resin particles in which the proportion by number of particles having a particle diameter having a particle diameter in the range of from 80% to 120% of the volume-average particle diameter is 83% or more, for example, resin particles in which the proportion by number of particles having a particle diameter in the range of from 80% to 120% of the volume-average particle diameter is 85% or more of all the particles can be obtained. In the resin particles, the proportion by number of particles having a particle diameter in the range of from 80% to 120% of the volume-average particle diameter is preferably 90% or more. Here, cracking of resin particle aggregates is difficult even with ultrasonic irradiation. In resin particles including aggregates, the proportion by number of particles having a particle diameter larger than 120% of the volume-average particle diameter increases. Also, when absorption of the polymerizable mixture into the seed particles is insufficient, the proportion by number of particles having a particle diameter less than 80% of the volume-average particle diameter increases since the proportion of small particles increases.

Furthermore, by the present invention, resin particles obtained by the above-described method comprising a resin derived from a polymerizable monomer comprising at least one of a styrene-based monomer and a (meth)acrylic-based monomer and having a value of b* measured by a color and color-difference meter after heating for 2 hours in a 150° C. thermostatic chamber in the range of from −1.0 to +2.0 can be provided. This range of the value of b* is a range difficult to be realized by the conventional production processes using a water-soluble polymer dispersant such as polyvinyl alcohol.

The resin particles of the present invention are resin particles comprising a resin from a polymerizable monomer comprising at least one of a styrene-based monomer and a (meth)acrylic-based monomer, wherein the proportion by number of particles having a particle diameter in the range of from 80% to 120% of the volume-average particle diameter is 83% or more and the value of b* measured by a color and color-difference meter after heating for 2 hours in a 150° C. thermostatic chamber is in the range of from −1.0 to +2.0.

Regarding the resin particles of the present invention, more preferably, the proportion by number of particles having a particle diameter in the range of from 80% to 120% of the volume-average particle diameter is 85% or more, and even more preferably, the proportion by number of particles having a particle diameter in the range of from 80% to 120% of the volume-average particle diameter is 90% or more. Since the proportion by number of fine particles having a particle diameter smaller than 80% of the volume-average particle diameter and the proportion by number of coarse particles having a particle diameter larger than 120% of the volume-average particle diameter can be further reduced thereby, properties such as an anti-glare property, an light diffusion property, and a matting property can be further improved when the resin particles of the present invention are mixed with another substance.

The resin particles of the present invention more preferably have a value of b* measured by a color and color-difference meter after heating for 2 hours in a 150° C. thermostatic chamber in the range of from −1.0 to +1.0. Yellowing of the resin particles when heated can be further suppressed thereby.

The content of inorganic components (inorganic elements; for example, magnesium) in the resin particles of the present invention is preferably 10 ppm (parts per million) or less, more preferably 5 μm or less, and even more preferably 2 ppm or less. If the content of inorganic components exceeds 10 ppm, when the resin particles are mixed with another substance such as a binder, since aggregation of the resin particles occurs by ionic bonding caused by the inorganic components and the resin particles react with other additives (for example, antistatic agents, flame retardants, and the like) by heating of the resin particles when the resin particles are kneaded into the resin, properties of the resin particles, for example, light diffusion property (that is, an anti-glare property) in anti-glare films, light diffusion property in light-diffuser films deteriorate, and yellowing in light-diffuser plates occurs.

The resin particles obtained by the production process of the present invention and the resin particles of the present invention can be used as a light-diffusing agent. Also, the resin particles obtained by the production process of the present invention and the resin particles of the present invention, other than light-diffusing agents, can be used in the electronics industry field as LCDs (liquid crystal displays), spacers, surface modifiers for silver salt films, modifier for magnetic tapes and films, thermosensitive paper running stabilizer, and the like; in the chemical field as rheology controlling agents, matting agents for paints and the like, inks, adhesives, chromatography fillers, and the like; in the medical field as carriers for diagnostic reagents (particles for antigen-antibody reaction analysis), and the like; in the cosmetic field as lubricants, body pigments, and the like, and in the general industry field as shrinkage diminishing agents of resins such as unsaturated polyesters, paper, dental materials, anti-blocking agents, matting agents, and resin modifiers; and the like.

[Coating Composition]

It is possible for the resin particles of the present invention to be contained in a coating composition as a matting agent for paints, light-diffusing agent for light-diffuser films, a light-diffusing agent for anti-glare films, and the like. The above-described coating composition includes resin particles of the present invention.

The above-described coating composition includes a binder resin according to necessity. As the above-described binder resin, a resin soluble in an organic solvent or water, or an emulsion-type aqueous resin that can be dispersed in water can be used. As such binder resins, acrylic resins such as ultraviolet cured-type acrylic resins (for example, multifunctional acrylates such as mixtures of pentaerythritol triacrylate and pentaerythritol tetraacrylate); alkyd resins; polyester resins; polyurethane resins; chlorinated polyolefin resins; amorphous polyolefin resins; and the like can be mentioned. These binder resins can be appropriately selected according to adherence to the base material to be coated, used environment, and the like. The added amount of the binder resin and the resin particles differs depending of the use, the thickness of the formed coating film, the average particle diameter of the resin particles, and the coating process.

The above-described coating composition includes a solvent according to necessity. As the solvent constituting the coating composition, there are no particular limitations and preferably a solvent that can dissolve or disperse the binder resin is used. For example, when the coating composition is an oil-based paint or the like, a hydrocarbon-based solvent such as toluene or xylene; a ketone-based solvent such as methyl ethyl ketone, methyl isobutyl ketone, or cyclopentanone, an ester-based solvent such as ethyl acetate or n-butyl acetate; an ether-based solvent such as dioxane, ethylene glycol diethyl ether, or ethylene glycol mono n-butyl ether; or the like can be used. When the coating composition is a water-based paint or the like, an aqueous solvent (aqueous medium) such as water, an alcohol, or the like can be used as the above-described solvent. These solvents can be used alone or by mixing two or more thereof. The amount of solvent in the coating composition is normally in the range of from 20 to 60% by weight based on the total amount of the coating composition.

The coating composition may include known coating surface modifiers, fluidity modifiers, ultraviolet absorbers, light stabilizers, curing catalysts such as photopolymerization initiators, body pigments, coloring pigments, metal pigments, mica powder pigments, dyes, and the like, according to necessity.

There are no particular limitations to the formation process of a coating film using the coating composition and any known process can be used. As the formation process of a coating film, for example, processes such as spray coating techniques, roll coating techniques, gravure coating techniques, comma coating techniques, die coating techniques, brush painting techniques, and bar coating techniques can be mentioned. The coating composition may be diluted with a diluent in order to adjust the viscosity according to necessity. As diluents, hydrocarbon-based solvents such as toluene and xylene; ketone-based solvents such as methyl ethyl ketone and methyl isobutyl ketone; ester-based solvents such as ethyl acetate, and butyl acetate; ether-based solvents such as dioxane and ethylene glycol diethyl ether; water; alcohol-based solvents; and the like can be mentioned. These diluents may be used alone or by mixing two or more thereof.

[Optical Film]

An optical film is obtained by coating the above-described coating composition on a transparent base film. The above-described optical film can be used as the anti-glare film, the light-diffuser film, or the like of the present invention.

There are no particular limitations to the material of the above-described transparent base film and for example, polyester-based resins such as polyethylene terephthalate; triacetyl cellulose resin; polystyrene-based resins; polycarbonate-based resins; cycloolefin-based resins; and the like can be mentioned.

The thickness of the above-described transparent base film is preferably in the range of from 5 to 300 μm. When the thickness of the above-described transparent base film is thinner than 5 μm, handling at the time of coating, printing, and secondary processing becomes difficult, and thus workability is reduced. In contrast, when the thickness of the above-described transparent base film is thicker than 300 μm, visible light transmittance of the transparent base film per se decreases.

An optical film such as the anti-glare film of the present invention is obtained by a means such as applying a layer of the above-described coating composition on at least one surface of a transparent base film. As the application method, roll coating techniques, spray coating techniques, bar coating techniques, and the like can be mentioned.

[External Preparation]

Furthermore, the resin particles of the present invention can be used as a raw material of an external preparation. The above-described external preparation includes resin particles of the present invention. The content of the resin particles in the external preparation can be appropriately set depending on the type of external preparation, and is preferably in the range of from 1 to 80% by weight and more preferably in the range of from 5 to 70% by weight. If the content of the resin particles based on the total amount of the external preparation is less than 1% by weight, a clear effect by the inclusion of the resin particles cannot be observed. Also, if the content of the resin particles is greater than 80% by weight, since a significant effect commensurate with the increased content cannot be observed, it is unpreferable from the viewpoint of production costs.

As external preparations, for example, cosmetics, external medical products, and the like can be mentioned.

There are no particular limitations to the cosmetics as long as the effects by inclusion of the resin particles are achieved and, for example, liquid cosmetics such as pre-shave lotion, body lotion, lotions, creams, milky lotion, body shampoo, and antiperspirant; washing cosmetic products such as soap and facial scrub; packs; shaving cream; face powder; foundation; lipsticks; lip cream; blusher; eyebrow cosmetic products; manicure cosmetic products; shampooing cosmetics; hair dyes; hair dressing products; aromatic cosmetic products; toothpaste; bath agents; sunscreen products; suntan products; and body cosmetics such as body powder and baby powder; and the like can be mentioned.

There are no particular limitations to the above-described external medical products as long as they are applied to the skin and, for example, medical creams, ointments, medical emulsions, medical lotions, and the like can be mentioned.

Also, normally used base compounds or additives can be blended in these external preparations according to purpose in a scope that does not interfere with the effects of the present invention. As such base compounds or additives, for example, water; lower alcohols (alcohols having a number of carbons of 5 or less); oils and fats, and waxes; hydrocarbons; higher fatty acids (fatty acids having a number of carbons of 12 or more); higher alcohols (alcohols having a number of carbons of 6 or more); sterol; fatty acid esters (cetyl 2-ethylhexanoate and the like); metal soaps; humectants; surfactants (sorbitan sesquioleate and the like); polymer compounds; clay minerals (components provided with various functions such as of a body pigment, absorbent, and the like; talc, mica, and the like); color material raw materials (titanium oxide, red iron oxide, yellow iron oxide, black iron oxide, and the like); perfumes; preservatives and fungicides; antioxidants; ultraviolet absorbers; other resin particles such as silicone-based particles and polystyrene particles; special blended additives; and the like can be mentioned

[Light-Diffusing Resin Composition]

The resin particles of the present invention, by dispersing in a transparent base resin (transparent resin), can be used as a raw material of optical members (light-diffusing resin composition) such as light covers and light-diffuser plates of liquid crystal display devices. The above-described light-diffusing resin composition comprises resin particles of the present invention and a transparent base resin.

As the above-described transparent base resin, a thermoplastic resin is normally used. As the above-described thermoplastic resin, for example, (meth)acrylic resins such as polymethyl methacrylate; alkyl (meth)acrylate-styrene copolymers; and polycarbonate, polyester, polyethylene, polypropylene, and polystyrene resin; and the like can be mentioned. Among these thermoplastic resins, when excellent transparency is required, (meth)acrylic resins; alkyl (meth)acrylate-styrene copolymers; polycarbonate; polyester; and polystyrene are preferable. These thermoplastic resins can be used alone or by mixing two or more thereof.

The added proportion of resin particles to the transparent base resin is preferably in the range of from 0.01 to 100 parts by weight of resin particles based on 100 parts by weight of the transparent base resin. Good light diffusion property and light permeability can be obtained thereby. When the above-described resin particles are less than 0.01 parts by weight based on 100 parts by weight of the transparent base resin, it becomes difficult to impart light diffusion property. When the above-described resin particles are more than 100 parts by weight based on 100 parts by weight of the transparent base resin, light diffusion property can be obtained but light permeability may become low. A more preferable added ratio of resin particles is in the range of from 0.1 to 10 parts by weight based on 100 parts by weight of the transparent base resin.

There are no particular limitations to the production process of the light-diffusing resin composition, and a light-diffusing resin composition can be produced by mixing resin particles of the present invention and a transparent base resin by a mixing process such as mechanical pulverization mixing process. In the mechanical pulverization mixing process, the light-diffusing resin composition can be produced by mixing and stirring the resin particles of the present invention and the transparent base resin using, for example, a Henschel mixer, V-type mixer, a tubular mixer, a hybridizer, a rocking mixer, or the like.

By molding the light-diffusing resin composition, a light-diffusing resin molded article such as a light diffusing resin molded sheet (optical sheet) can be produced. For example, after obtaining a pellet comprising the light-diffusing resin composition by mixing resin particles of present invention and a transparent base resin in a mixer and kneading in a melt kneader such as an extruder, a light-diffusing resin molded article having any shape can be formed by extrusion molding or injection molding after melting this pellet.

The light-diffusing resin molded article, for example, can be used as a light cover such as a light cover for light-emitting diode (LED) lighting and a light cover for fluorescent lighting; and a light-diffuser plate of a liquid crystal display device. There are no particular limitations to the constitution of the liquid crystal display device as long as it includes the light-diffuser plate (light-diffusing resin molded article). For example, the liquid crystal display device is at least provided with a liquid crystal display panel having a display surface and a rear surface, a light guide plate arranged on the rear surface side of this panel, and a light source for irradiating light on the side surface of the light guide plate. Also, the liquid crystal display device is provided with a light-diffuser plate on the surface facing the liquid crystal display panel in the light guide plate and provided with a reflection sheet on the opposite surface side to the surface facing the liquid crystal display panel in the light plate guide. Also, a reflection sheet is provided on the surface side opposite to the surface facing the liquid crystal display panel of the light guide plate. The arrangement of this light source is normally referred to as an edge light-type backlight arrangement. As an arrangement of the light source in the liquid crystal display other than the above-described edge light-type backlight arrangement, there is also the directly below-type backlight arrangement. This arrangement is specifically an arrangement in which the light source is arranged on the rear surface side of the liquid crystal display panel, and at least a light-diffuser plate arranged between the liquid crystal display panel and the light source is provided.

EXAMPLES

Although the present invention is explained in more detail below based on examples, the present invention is not limited to these examples. In the production examples, examples, and comparative examples below, the volume-average particle diameter of seed particles (primary particles, seed particles 1, and seed particles 2) and the volume-average particle diameter of resin particles were measured by the following measurement methods.

[Measurement Method for Volume-Average Particle Diameter of Seed Particles]

The volume-average particle size of seed particles was measured using the laser diffraction scattering particle size distribution measurement device "LS230" manufactured by Beckman Coulter, Inc. Specifically, 0.1 g of seed particles and 10 ml of a 0.1% by weight non-ionic surfactant aqueous solution were charged into a test tube and mixed for 2 seconds with the touch mixer "TOUCHMIXER MT-31" manufactured by Yamato Scientific Co., Ltd. The seed particles in the test tube were subsequently dispersed for 10 minutes using the commercially-available ultrasonic cleaner "ULTRASONIC CLEARNER VS-150" manufactured by VELVO-CLEAR Co., Ltd. to obtain a dispersion. While irradiating the dispersion with ultrasonic waves, the volume-average particle diameter of the dispersed seed particles (arithmetic mean diameter in the volume-based particle size distribution) was measured using the laser diffraction scattering particle size distribution measurement device "LS230" manufactured by Beckman Coulter, Inc. The optical model at the time of such measurement was matched with the diffractive index of the prepared seed particles.

[Measurement Method for Volume-Average Particle Diameter of Resin Particles]

Using the Coulter-system accurate particle size distribution measurement device "Coulter Multisizer II" (manufactured by Beckman Coulter, Inc.), the volume-average particle diameter of resin particles was measured by carrying out calibration of the "Coulter Multisizer II" using an aperture having an aperture size (aperture diameter) of 50 µm in accordance with the REFERENCE MANUAL FOR THE COULTER MULTISIZER (1987) published by Coulter Electronics Limited.

Specifically, 0.1 g of resin particles and 10 ml of a 0.1% by weight non-ionic surfactant aqueous solution were preliminarily dispersed using the touch mixer "TOUCHMIXER MT-31" manufactured by Yamato Scientific Co., Ltd. and the commercially-available ultrasonic cleaner "ULTRASONIC CLEARNER VS-150" manufactured by VELVO-CLEAR Co., Ltd. to obtain a dispersion. Next, the above-described dispersion, while being stirred gently, was dropped with a dropper into a beaker, which has been filled with "ISOTON® II" (manufactured by Beckman Coulter, Inc., measurement electrolyte), attached to the main body of the "Coulter Multisizer II" so that the reading of the concentration meter on the main body screen of the "Coulter Multisizer II" was about 10%. Next, an aperture size of 50 µm, a current (aperture current) of 800 µA, a gain of 4, and a polarity (polarity of internal electrode) of positive (+) were input into the main body of the "Coulter Multisizer II", and the volume basis particle size distribution chart and the number basis particle size distribution chart were measured in manual mode (manual). During measurement, the dispersion in the beaker was gently stirred to the extent that air bubbles are not introduced and measurement was completed at the point of measurement of 100,000 resin particles.

From the measurement results, a volume basis particle size distribution chart and a number basis particle size distribution chart were obtained. From the obtained volume basis particle size distribution chart, the volume-weighted average value (arithmetic mean particle diameter in the volume % mode) of the particle diameter is calculated as the volume-average particle diameter of the resin particles.

From the obtained number basis particle size distribution chart and the calculated volume-average particle diameter, the proportion by number (based on all particles) of particles excluding the proportion by number of fine particles having a particle diameter smaller than 80% of the volume-average particle diameter and coarse particles having a particle diameter larger than 120% of the volume-average particle diameter have been removed, that is, the proportion by number (number %) of particles having a particle diameter in the range of from 80% to 120% of volume-average particle diameter is calculated.

Production Example 1 of Seed Particles 108 g of methyl methacrylate (MMA) as an acrylic-based monomer and 11 g of n-octyl mercaptan as a molecular weight modifier were charged into 630 g of pure water (an aqueous medium) in a vessel. After $N_2$ (nitrogen gas) purging (air in the vessel was replaced with $N_2$) the inside of the vessel, the temperature was raised to 55° C.

An aqueous solution in which 0.54 g of potassium persulfate as a polymerization initiator has been dissolved in 100 g of pure water was subsequently charged into the vessel. After $N_2$ purging the inside of the vessel again, polymerization was carried out for 12 hours at 55° C. to obtain seed particles 1 (acrylic-based resin particles) in a slurry state having a volume-average particle diameter of 0.75 μm.

Production Example 2 of Seed Particles 108 g of methyl methacrylate (MMA) as an acrylic-based monomer and 11 g of octyl mercaptan as a molecular weight modifier were charged into 630 g of pure water (an aqueous medium) in a vessel. After $N_2$ purging the inside of the vessel, the temperature was raised to 70° C. An aqueous solution in which 0.54 g of potassium persulfate as a polymerization initiator has been dissolved in 100 g of pure water was subsequently charged into the vessel. After $N_2$ purging the inside of the vessel again, polymerization was carried out for 12 hours at 55° C. to obtain primary particles (seed particles) in a slurry state having a volume-average particle diameter of 0.45 μm.

650 g of ion-exchange water, and a solution in which 160 g of methyl methacrylate as an acrylic-based monomer and 3 g of octyl mercaptan as a molecular weight modifier have been dissolved were charged into a vessel. 80 g of the slurry (dispersion) including the primary particles was further added and the obtained dispersion was heated to 70° C. in a nitrogen stream while stirring. A polymerization reaction was carried out by continuously charging an aqueous solution in which 0.8 g of ammonium persulfate as a polymerization initiator has been dissolved in 100 g of ion-exchange water and stirring for 12 hours at 70° C. By this polymerization reaction, seed particles 2 consisting of polymethyl methacrylate particles having a volume-average particle diameter of 1.1 μm were obtained in a slurry state.

Example 1

A polymerizable mixture was obtained by dissolving 0.4 g of 2,2'-azobis(2,4-dimethylvaleronitrile) as a polymerization initiator in polymerizable monomers consisting of 28 g of n-butyl methacrylate as a (meth)acrylic-based monomer, 28 g of styrene as a styrene-based monomer, and 24 g of ethylene glycol dimethacrylate as a multifunctional (meth) acrylic-based monomer.

Separate to the above-described polymerizable mixture, an aqueous solution was obtained by dissolving 0.8 g of sodium dioctyl sulfosuccinate as an anionic surfactant not having a polyoxyethylene chain but having an alkyl group in 80 g of pure water as an aqueous medium.

After adding the above-described polymerizable mixture to the above-described aqueous solution, the obtained dispersion was treated for 10 minutes at a stirring rotation speed of 8,000 rpm using a "T.K. HOMO MIXER MARK II Model 2.5" (high-speed emulsifier/disperser manufactured by PRIMIX® Corporation) to obtain an emulsion. The above-described emulsion was inserted into a reaction vessel having an internal capacity of 1 liter equipped with a stirrer and a thermometer. 8.9 g of the slurry containing seed particles 1 obtained in Production Example 1 (contains 14% by weight of seed particles 1) was subsequently added to the above-described emulsion to obtain a mixture. Next, while stirring the obtained mixture by the stirrer for 4 hours at a stirring rotation speed of 120 rpm, the polymerizable mixture was absorbed into the seed particles 1. A solution comprising seed particles 1 which have absorbed the polymerizable mixture was obtained thereby.

0.8 g of "Phosphanol® LO-529" (manufactured by Toho Chemical Industry Co., Ltd.; mixture of 70% by weight of sodium polyoxyethylene nonylphenyl ether phosphate, 20% by weight of polyoxyethylene nonylphenyl ether, and 10% by weight of water) as an anionic surfactant having a polyoxyethylene chain was added to 240 g of pure water to obtain a surfactant aqueous solution. The above-described solution comprising seed particles 1 which have absorbed the polymerizable mixture was added to the obtained surfactant aqueous solution. After addition, by polymerizing the above-described polymerizable monomers for 12 hours at 70° C., resin particles having a volume-average particle diameter of 3 μm were obtained. No aggregation occurred after polymerization. Furthermore, after deliquifying the suspension comprising resin particles after polymerization by a pressurized filtration technique, surfactant attached to the surface of the resin particles was removed by adding ion-exchange water in an amount of 12 times the solid content in the suspension and carrying out pressurized filtration. Deliquification was subsequently carried out by pressurized filtration again and the resin particles were sufficiently dried in a 60° C. thermostat chamber to obtain a dried body of resin particles. The scanning electron micrograph of the obtained resin particles is shown in FIG. 1.

Regarding the obtained resin particles, the proportion by number of particles having a particle diameter in the range of from 80% to 120% of the volume-average particle diameter was 90%, and thus the particle diameter thereof was very uniform.

Example 2

Other than using 28 g of n-butyl acrylate instead of 28 g of n-butyl methacrylate as the (meth)acrylic-based monomer, resin particles having a volume-average particle diameter of 3 µm were obtained by carrying out the same as in Example 1. No aggregation occurred after polymerization.

Regarding the obtained resin particles, the proportion by number of particles having a particle diameter in the range of from 80% to 120% of the volume-average particle diameter was 85%, and thus the particle diameter thereof was very uniform.

Example 3

Other than replacing the polymerizable monomers consisting of 28 g of n-butyl methacrylate, 28 g of styrene, and 24 g of ethylene glycol dimethacrylate with polymerizable monomers consisting of 56 g of styrene and 24 g of ethylene glycol dimethacrylate, resin particles having a volume-average particle diameter of 3 µm were obtained by carrying out the same as in Example 1. No aggregation occurred after polymerization.

Regarding the obtained resin particles, the proportion by number of particles having a particle diameter in the range of from 80% to 120% of the volume-average particle diameter was 86%, and thus the particle diameter thereof was very uniform.

Example 4

Other than adding a polyoxyethylene styrenated phenyl ether ammonium sulfate ("HITENOL® NF-17" manufactured by Dai-ichi Kogyo Seiyaku Co., Ltd.) instead of "Phosphanol® LO-529" when polymerizing, resin particles having a volume-average particle diameter of 3 µm were obtained by carrying out the same as in Example 1. No aggregation occurred after polymerization.

Regarding the obtained resin particles, the proportion by number of particles having a particle diameter in the range of from 80% to 120% of the volume-average particle diameter was 88%, and thus the particle diameter thereof was very uniform.

Example 5

A polymerizable mixture was obtained by dissolving 0.4 g of 2,2'-azobis(2,4-dimethylvaleronitrile) as a polymerization initiator in polymerizable monomers consisting of 56 g of n-butyl methacrylate as a (meth)acrylic-based monomer and 24 g of ethylene glycol dimethacrylate as a multifunctional (meth)acrylic-based monomer.

Separate to the above-described polymerizable mixture, an aqueous solution was obtained by dissolving 0.8 g of sodium dioctyl sulfosuccinate as an anionic surfactant not having a polyoxyethylene chain but having an alkyl group in 80 g of pure water as an aqueous medium.

After adding the above-described polymerizable mixture to the above-described aqueous solution, the obtained dispersion was treated for 10 minutes at a stirring rotation speed of 8,000 rpm using a "T.K. HOMO MIXER MARK II Model 2.5" (high-speed emulsifier/disperser manufactured by PRIMIX® Corporation) to obtain an emulsion. The above-described emulsion was inserted into a reaction vessel having an internal capacity of 1 liter equipped with a stirrer and a thermometer. 8.9 g of the slurry containing seed particles 1 obtained in Production Example 1 (contains 14% by weight of seed particles 1) was subsequently added to the above-described emulsion to obtain a mixture. Next, while stirring the obtained mixture by the stirrer for 4 hours at a stirring rotation speed of 120 rpm, the polymerizable mixture was absorbed into the seed particles. A solution comprising seed particles 1 which have absorbed the polymerizable mixture was obtained thereby.

Figure 2:
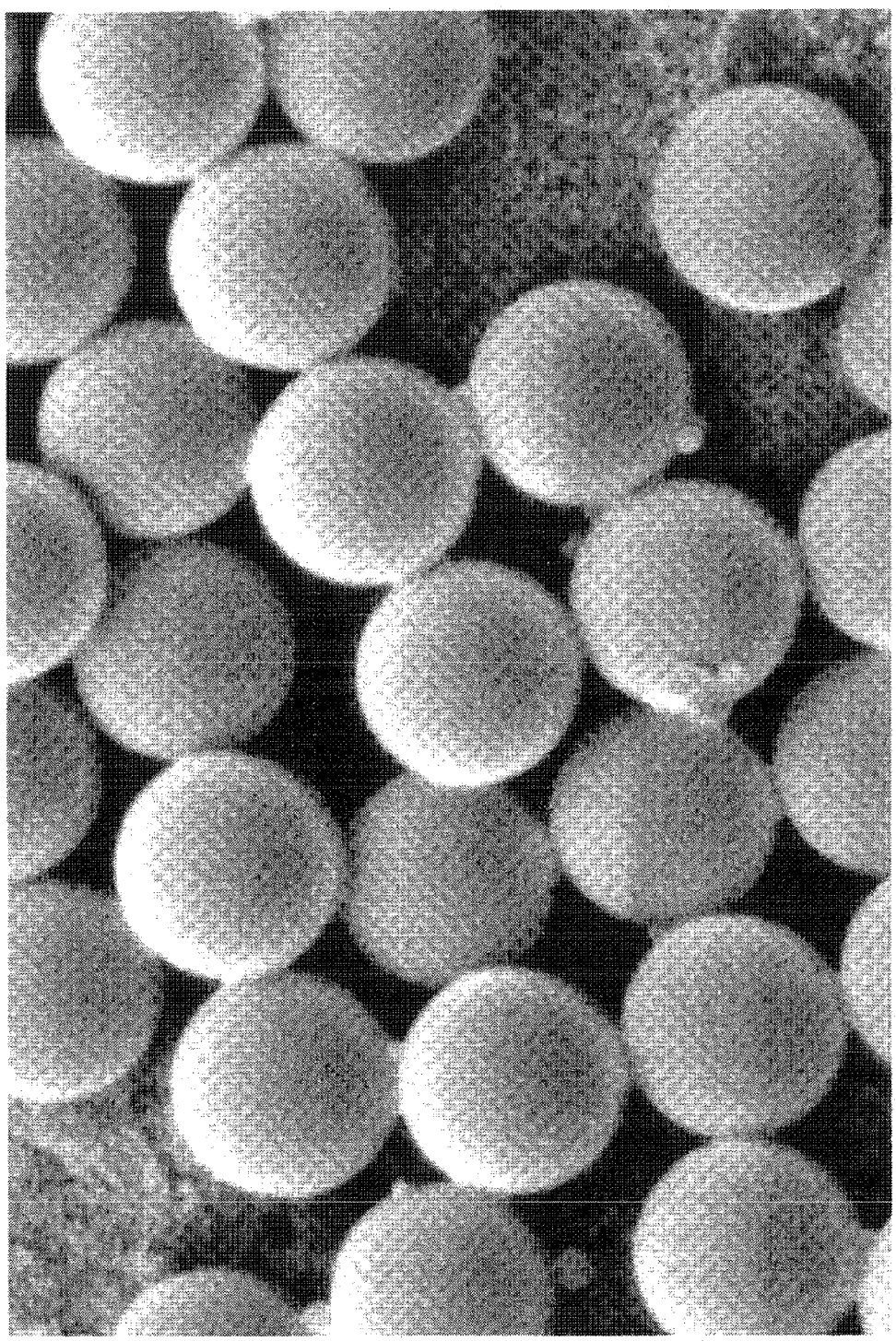
FIG. 2 is a scanning electron micrograph of the polymer particles obtained in Example 5.

0.8 g of a polyoxyethylene tridecyl ether phosphate ester ("Phosphanol® LO-529" (manufactured by Toho Chemical Industry Co., Ltd.) as an anionic surfactant having a polyoxyethylene chain was added to 240 g of pure water to obtain a surfactant aqueous solution. To the obtained surfactant aqueous solution, the above-described solution comprising seed particles 1 which have absorbed the polymerizable mixture was added. After addition, by polymerizing the above-described polymerizable monomers for 12 hours at 70° C., resin particles having a volume-average particle diameter of 3 µm were obtained. No aggregation occurred after polymerization. Furthermore, after deliquifying the suspension comprising resin particles after polymerization by a pressurized filtration technique, surfactant attached to the surface of the resin particles was removed by adding ion-exchange water in an amount of 12 times the solid content in the suspension and carrying out pressurized filtration. Deliquification was subsequently carried out by pressurized filtration again and the resin particles were sufficiently dried in a 60° C. thermostat chamber to obtain a dried body of resin particles. The scanning electron micrograph of the obtained resin particles is shown in FIG. 2.

Regarding the obtained resin particles, the proportion by number of particles having a particle diameter in the range of from 80% to 120% of the volume-average particle diameter was 91%, and thus the particle diameter thereof was very uniform.

Example 6

Other than replacing the polymerizable monomers consisting of 56 g of n-butyl methacrylate and 24 g of ethylene glycol dimethacrylate with polymerizable monomers consisting of 28 g of n-butyl methacrylate, 28 g of n-butyl acrylate, and 24 g of ethylene glycol dimethacrylate, resin particles having a volume-average particle diameter of 3 µm were obtained by carrying out the same as in Example 5. No aggregation occurred after polymerization.

Regarding the obtained resin particles, the proportion by number of particles having a particle diameter in the range of from 80% to 120% of the volume-average particle diameter was 88%, and thus the particle diameter thereof was very uniform.

Example 7

Other than adding a polyoxyethylene styrenated phenyl ether ammonium sulfate ("HITENOL® NF-17" manufactured by Dai-ichi Kogyo Seiyaku Co., Ltd.) instead of "Phosphanol® LO-529" when polymerizing, resin particles having a volume-average particle diameter of 3 pro were obtained by carrying out the same as in Example 5. No aggregation occurred after polymerization.

Regarding the obtained resin particles, the proportion by number of particles having a particle diameter in the range of from 80% to 120% of the volume-average particle diameter was 90%, and thus the particle diameter thereof was very uniform.

Example 8

Other than adding a polyoxyethylene styrenated phenyl ether phosphate ester ("PLYSURF® AL" manufactured by Dai-ichi Kogyo Seiyaku Co., Ltd) instead of "Phosphanol®

LO-529" when polymerizing, resin particles having a volume-average particle diameter of 3 μm were obtained by carrying out the same as in Example 5. No aggregation occurred after polymerization.

Regarding the obtained resin particles, the proportion by number of particles having a particle diameter in the range of from 80% to 120% of the volume-average particle diameter was 92%, and thus the particle diameter thereof was very uniform.

Example 9

Other than adding a polyoxyethylene alkyl (C8) ether phosphate ester ("PLYSURF® A208F" manufactured by Dai-ichi Kogyo Seiyaku Co., Ltd) instead of "Phosphanol® LO-529" when polymerizing, resin particles having a volume-average particle diameter of 3 μm were obtained by carrying out the same as in Example 5. No aggregation occurred after polymerization.

Regarding the obtained resin particles, the proportion by number of particles having a particle diameter in the range of from 80% to 120% of the volume-average particle diameter was 90%, and thus the particle diameter thereof was very uniform.

Example 10

Other than replacing the polymerizable monomers consisting of 56 g of n-butyl methacrylate and 24 g of ethylene glycol dimethacrylate with polymerizable monomers consisting of 32 g of n-butyl methacrylate, 24 g of styrene, and 24 g of ethylene glycol dimethacrylate, and the used amount of the slurry containing seed particles 1 being 3 g, resin particles having a volume-average particle diameter of 4 μm were obtained by carrying out the same as in Example 5. No aggregation occurred after polymerization.

Regarding the obtained resin particles, the proportion by number of particles having a particle diameter in the range of from 80% to 120% of the volume-average particle diameter was 87%, and thus the particle diameter thereof was very uniform.

Example 11

Other than replacing the polymerizable monomers consisting of 56 g of n-butyl methacrylate and 24 g of ethylene glycol dimethacrylate with polymerizable monomers consisting of 28 g of n-butyl methacrylate, 28 g of n-butyl acrylate, and 24 g of ethylene glycol dimethacrylate, and using 6 g of the slurry containing seed particles 2 obtained in Production Example 2 instead of 8.9 g of the slurry containing seed particles 1, resin particles having a volume-average particle diameter of 5.3 μm were obtained by carrying out the same as in Example 5. No aggregation occurred after polymerization.

Regarding the obtained resin particles, the proportion by number of particles having a particle diameter in the range of from 80% to 120% of the volume-average particle diameter was 88%, and thus the particle diameter thereof was very uniform.

Example 12

A polymerizable mixture was obtained by dissolving 0.4 g of benzoyl peroxide as a polymerization initiator in a mixture (polymerizable monomer) consisting of 32 g of methyl methacrylate as a (meth)acrylic-based monomer, 24 g of styrene as a styrene-based monomer, and 24 g of ethylene glycol dimethacrylate as a multifunctional (meth)acrylic-based monomer.

Separate to the above-described polymerizable mixture, an aqueous solution was obtained by dissolving 0.8 g of sodium dodecylbenzene sulfonate as an anionic surfactant not having a polyoxyethylene chain but having an alkyl group in 80 g of pure water as an aqueous medium. The above-described polymerizable mixture was added to the above-described aqueous solution and the obtained dispersion was treated for 10 minutes at a stirring rotation speed of 8,000 rpm using a "T.K. HOMO MIXER MARK II Model 2.5" (high-speed emulsifier/disperser manufactured by PRIMIX® Corporation) to obtain an emulsion. The emulsion was inserted into a reaction vessel having an internal capacity of 1 liter equipped with a stirrer and a thermometer, and 8.9 g of the slurry containing seed particles 1 obtained in Production Example 1 was added to the above-described emulsion to obtain a mixture. Next, the obtained mixture was stirred by the stirrer for 4 hours at a stirring rotation speed of 120 rpm to swell the seed particles 1 in the slurry (polymerizable mixture was absorbed into the seed particles 1).

After the completion of swelling, by adding 240 g of pure water as an aqueous medium and 0.8 g of "Phosphanol® LO-529" as an anionic surfactant having a polyoxyethylene chain to the slurry comprising swelled seed particles, polymerizing the above-described polymerizable monomer for 12 hours at 70° C., resin particles having a volume-average particle diameter of 3 μm were obtained. Aggregation did not occur after polymerization. Furthermore, after deliquifying the suspension comprising resin particles after polymerization by a pressurized filtration technique, surfactant attached to the surface of the resin particles was removed by adding ion-exchange water in an amount of 12 times the solid content in the suspension and carrying out pressurized filtration. Deliquification was subsequently carried out by pressurized filtration again and the resin particles were sufficiently dried in a 60° C. thermostat chamber to obtain a dried body of resin particles.

Regarding the obtained resin particles, the proportion by number of particles having a particle diameter in the range of from 80% to 120% of the volume-average particle diameter was 84%, and thus the particle diameter thereof was very uniform.

Comparative Example 1

Other than adding 1.6 g of "Phosphanol® LO-529" instead of 0.8 g of sodium dioctyl sulfosuccinate at the time of absorption, and not adding "Phosphanol® LO-529" at the time of polymerization, resin particles were obtained the same as in Example 1.

Figure 3:
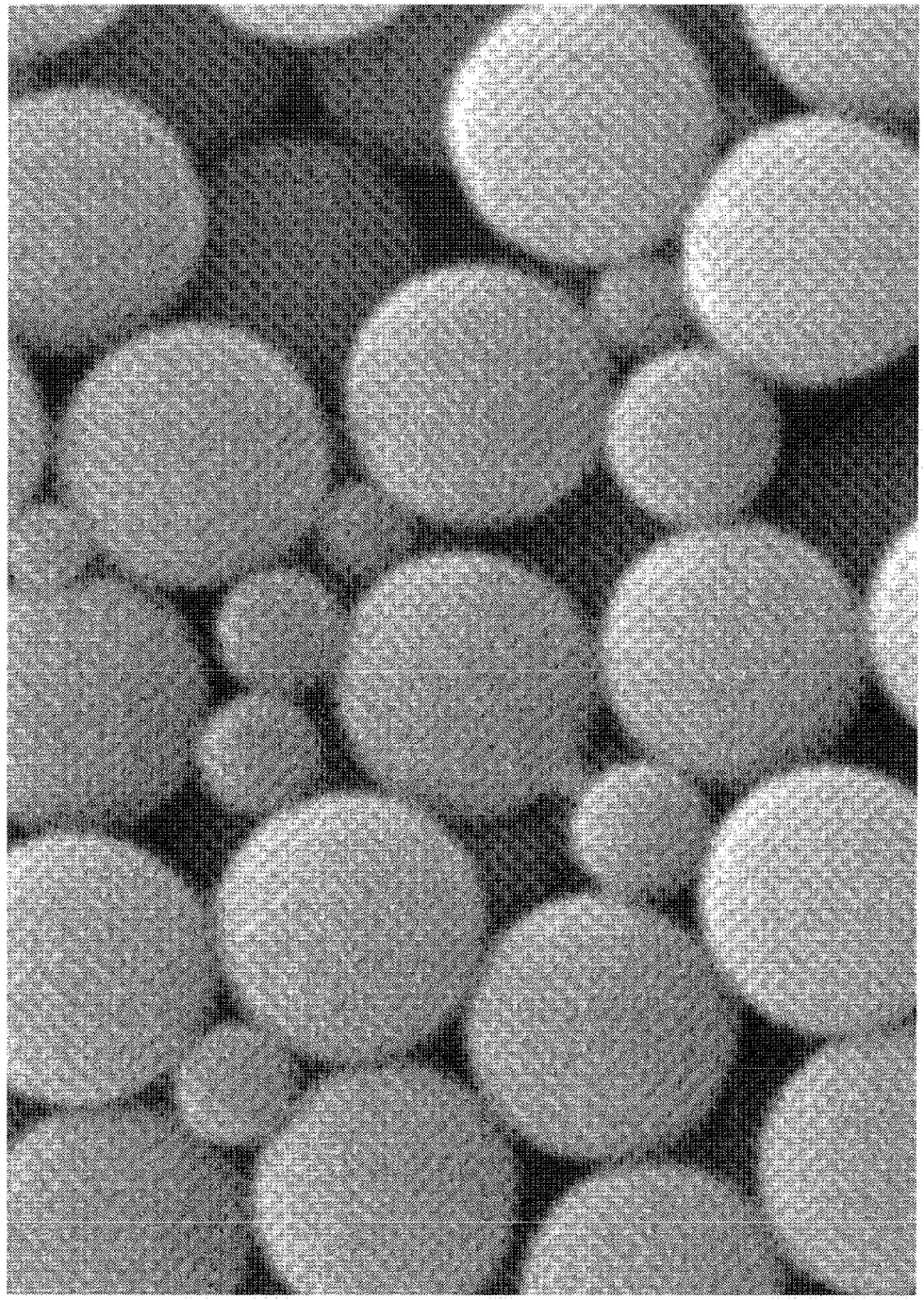
FIG. 3 is a scanning electron micrograph of the polymer particles obtained in Comparative Example 1.

However, absorption of the polymerizable mixture into the seed particles 1 was insufficient. For this reason, regarding the obtained resin particles, it was recognized that the proportion by number of particles having a particle diameter in the range of from 80% to 120% of the volume-average particle diameter was 80%, absorption of the polymerizable mixture into the seed particles 1 is insufficient (absorption deficiency), and they are resin particles including aggregated particles. The scanning electron micrograph of the obtained resin particles is shown in FIG. 3.

Comparative Example 2

Other than adding 0.8 g of sodium dioctyl sulfosuccinate and 0.8 g of "Phosphanol® LO-529" instead of 0.8 g of sodium dioctyl sulfosuccinate at the time of absorption, and not adding "Phosphanol® LO-529" at the time of polymerization, resin particles having a volume-average particle diameter of 2.8 μm were obtained the same as in Example 1. Aggregation occurred after polymerization.

Regarding the obtained resin particles, it was recognized that the proportion by number of particles having a particle diameter in the range of from 80% to 120% of the volume-average particle diameter was 81%, absorption of the polymerizable mixture into the seed particles 1 is insufficient, and they are resin particles including aggregated particles.

Comparative Example 3

Other than adding 0.8 g of a polyoxyethylene styrenated phenyl ether ammonium sulfate ("HITENOL® NF-17") instead of 0.8 g of sodium dioctyl sulfosuccinate at the time of absorption, resin particles were obtained the same as in Example 1.

However, since absorption of the polymerizable mixture into the seed particles 1 is insufficient, regarding the obtained resin particles, the proportion by number of particles having a particle diameter in the range of from 80% to 120% of the volume-average particle diameter was 76%, and are resin particles in which the proportion by number of small particles having a particle diameter less than 80% of the volume-average particle diameter is large.

Comparative Example 4

Other than adding 0.8 g of "Phosphanol® LO-529" instead of 0.8 g of sodium dioctyl sulfosuccinate at the time of absorption, and adding 0.8 g of sodium dioctyl sulfosuccinate instead of 0.8 g of "Phosphanol® LO-529" at the time of polymerization, resin particles were obtained the same as in Example 1.

Regarding the obtained resin particles, it was recognized that the proportion by number of particles having a particle diameter in the range of from 80% to 120% of the volume-average particle diameter was 78%, absorption of the polymerizable mixture into the seed particles 1 is insufficient, and furthermore, they are resin particles including aggregated particles.

Comparative Example 5

Figure 4:
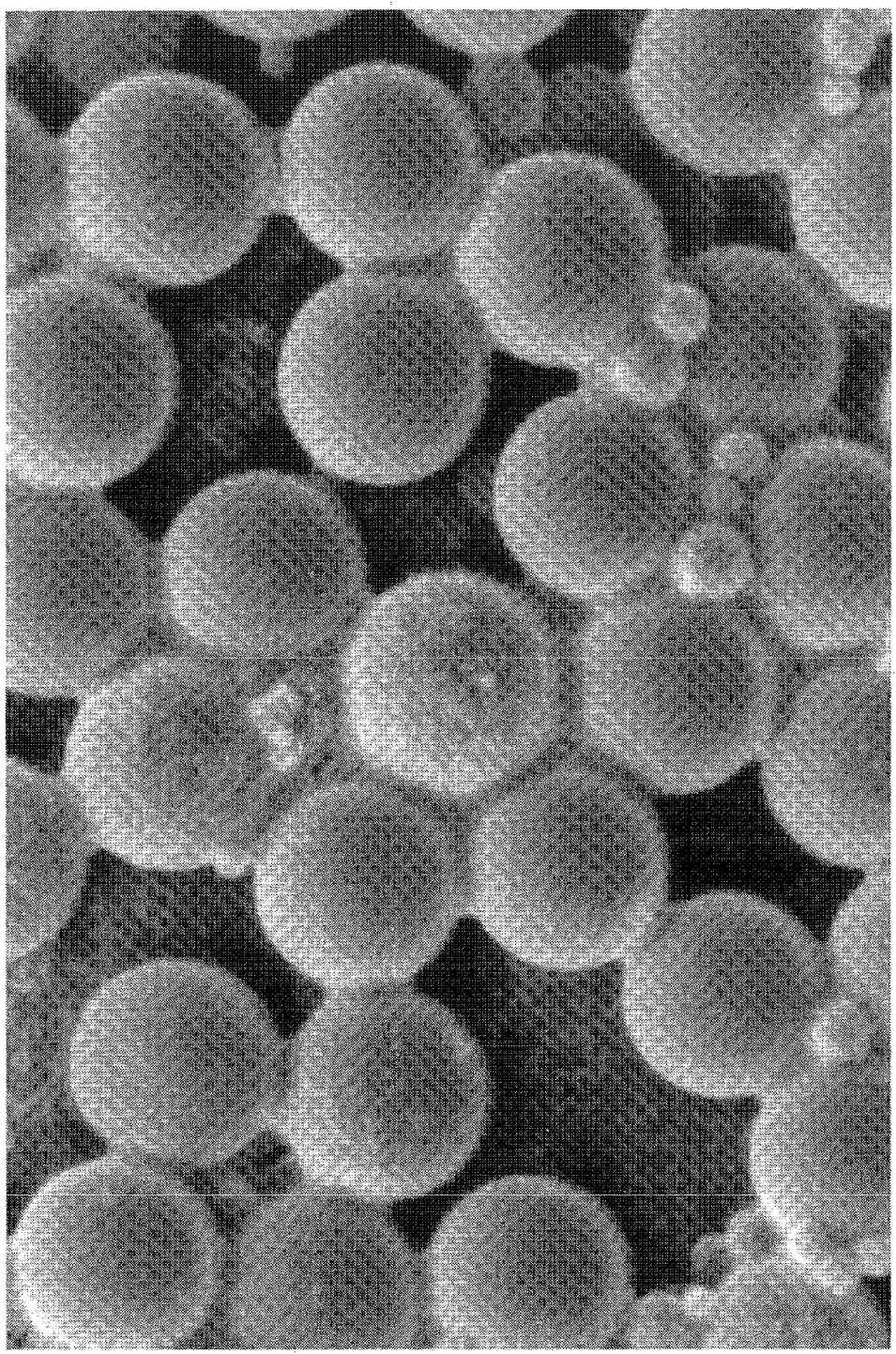
FIG. 4 is a scanning electron micrograph of the polymer particles obtained in Comparative Example 5.

Other than adding 1.6 g of "Phosphanol® LO-529" instead of 0.8 g of sodium dioctyl sulfosuccinate at the time of absorption, and not adding "Phosphanol® LO-529" at the time of polymerization, resin particles were obtained the same as in Example 5. The scanning electron micrograph of the obtained resin particles is shown in FIG. 4.

However, absorption of the polymerizable mixture into the seed particles 1 was insufficient. For this reason, regarding the obtained resin particles, the proportion by number of particles having a particle diameter in the range of from 80% to 120% of the volume-average particle diameter was 78% and they are particles in which the proportion by number of small particles having a particle diameter less than 80% of the volume-average particle diameter is large.

Comparative Example 6

Other than adding 0.8 g of sodium dioctyl sulfosuccinate and 0.8 g of "Phosphanol® LO-529" instead of 0.8 g of sodium dioctyl sulfosuccinate at the time of absorption, and not adding "Phosphanol® LO-529" at the time of polymerization, resin particles having a volume-average particle diameter of 2.8 μm were obtained the same as in Example 5. Aggregation occurred after polymerization.

Regarding the obtained resin particles, the proportion by number of particles having a particle diameter in the range of from 80% to 120% of the volume-average particle diameter was 74% and aggregates of the resin particles formed.

Comparative Example 7

Other than adding 0.8 g of a polyoxyethylene styrenated phenyl ether ammonium sulfate ("HITENOL® NF-17") instead of 0.8 g of sodium dioctyl sulfosuccinate at the time of absorption, resin particles having a volume-average particle diameter of 2.8 μm were obtained the same as in Example 5.

Regarding the obtained resin particles, the proportion by number of particles having a particle diameter in the range of from 80% to 120% of the volume-average particle diameter was 76% and small particles formed.

Comparative Example 8

Other than adding 0.8 g of "Phosphanol® LO-529" instead of 0.8 g of sodium dioctyl sulfosuccinate at the time of absorption, and adding 0.8 g of sodium dioctyl sulfosuccinate instead of 0.8 g of "Phosphanol® LO-529" at the time of polymerization, resin particles having a volume-average particle diameter of 3.2 μm were obtained the same as in Example 5. Aggregation occurred after polymerization.

Regarding the obtained resin particles, the proportion by number of particles having a particle diameter in the range of from 80% to 120% of the volume-average particle diameter was 72%, and small particles were formed as well as further aggregates of the resin particles also formed.

Comparative Example 9

A polymerizable mixture was obtained by dissolving 0.4 g of 2,2'-azobis(2,4-dimethylvaleronitrile), which is a polymerization initiator, in polymerizable monomers consisting of 28 g of n-butyl methacrylate, 28 g of styrene, and 24 g of ethylene glycol dimethacrylate.

Separate to the above-described polymerizable mixture, an aqueous solution was obtained by dissolving 0.8 g of sodium dioctyl sulfosuccinate, which is an anionic surfactant not having a polyoxyethylene chain but having an alkyl group, in 80 g of pure water.

After adding the above-described polymerizable mixture to the above-described aqueous solution, the obtained dispersion was treated for 10 minutes at a stirring rotation speed of 8,000 rpm using a "T.K. HOMO MIXER MARK II Model 2.5" (high-speed emulsifier/disperser manufactured by PRIMIX® Corporation) to obtain an emulsion. The above-described emulsion was inserted into a reaction vessel having an internal capacity of 1 liter equipped with a stirrer and a thermometer. 3.0 g of the slurry containing seed particles 1 obtained in Production Example 1 was subsequently added to the above-described emulsion to obtain a mixture. Next, while stirring the obtained mixture by the stirrer for 4 hours at a stirring rotation speed of 120 rpm, the polymerizable mixture absorbed into the seed particles 1. A solution comprising seed particles 1 which have absorbed the polymerizable mixture was obtained thereby.

3.2 g of polyvinyl alcohol (GH-17 manufactured by The Nippon Synthetic Chemical Industry Co., Ltd.) as a water-soluble polymer dispersant (water-soluble organic dispersant) was added to 240 g of pure water to obtain a polyvinyl alcohol aqueous solution. The above-described solution comprising seed particles 1 which have absorbed the polymerizable mixture was added to the obtained polyvinyl alcohol aqueous solution. After addition, by polymerizing the above-described polymerizable monomers for 12 hours at 70° C., resin particles having a volume-average particle diameter of 4 μm were obtained. Aggregation did not occur after polymerization. Furthermore, the resin particles were washed by, after deliquifying the suspension comprising resin particles after polymerization by a pressurized filtration technique, adding ion-exchange water in an amount of 12 times the solid content in the suspension and carrying out pressurized filtration. Deliquification was subsequently carried out by pressurized filtration again and the resin particles were sufficiently dried in a 60° C. thermostat chamber to obtain a dried body of resin particles. Since polyvinyl alcohol remained in the dried body of resin particles, such were strongly bound.

Regarding the resin particles obtained after cracking, the proportion by number of particles having a particle diameter in the range of from 80% to 120% of the volume-average particle diameter was 89% and thus the particle diameter thereof was very uniform.

Comparative Example 10

A polymerizable mixture was obtained by dissolving 0.4 g of 2,2'-azobis(2,4-dimethylvaleronitrile), which is a polymerization initiator, in polymerizable monomers consisting of 28 g of n-butyl methacrylate, 28 g of n-butyl acrylate, and 24 g of ethylene glycol dimethacrylate.

Separate to the above-described polymerizable mixture, an aqueous solution was obtained by dissolving 0.8 g of sodium dioctyl sulfosuccinate, which is an anionic surfactant not having a polyoxyethylene chain but having an alkyl group, in 80 g of pure water.

After adding the above-described polymerizable mixture to the above-described aqueous solution, the obtained dispersion was treated for 10 minutes at a stirring rotation speed of 8,000 rpm using a "T.K. HOMO MIXER MARK II Model 2.5" (high-speed emulsifier/disperser manufactured by PRIMIX® Corporation) to obtain an emulsion. The above-described emulsion was inserted into a reaction vessel having an internal capacity of 1 liter equipped with a stirrer and a thermometer. 3.0 g of the slurry containing seed particles 1 obtained in Production Example 1 was subsequently added to the above-described emulsion to obtain a mixture. Next, while stirring the obtained mixture by the stirrer for 4 hours at a stirring rotation speed of 120 rpm, the polymerizable mixture absorbed into the seed particles 1.

3.2 g of polyvinyl alcohol (GH-17 manufactured by The Nippon Synthetic Chemical Industry Co., Ltd.) as a water-soluble polymer dispersant (water-soluble organic dispersant) was added to 240 g of pure water to obtain a polyvinyl alcohol aqueous solution. The above-described solution comprising seed particles 1 which have absorbed the polymerizable mixture was added to the obtained polyvinyl alcohol aqueous solution. After addition, by polymerizing the above-described polymerizable monomers for 12 hours at 70° C., resin particles having a volume-average particle diameter of 4 μm were obtained. Aggregation did not occur after polymerization. Furthermore, the resin particles were washed by, after deliquifying the suspension comprising resin particles after polymerization by a pressurized filtration technique, adding ion-exchange water in an amount of 12 times the solid content in the suspension and carrying out pressurized filtration. Deliquification was subsequently carried out by pressurized filtration again and the resin particles were sufficiently dried in a 60° C. thermostat chamber to obtain a dried body of resin particles. Since polyvinyl alcohol remained in the dried body of resin particles, such were strongly bound.

Regarding the resin particles obtained after cracking, the proportion by number of particles having a particle diameter in the range of from 80% to 120% of the volume-average particle diameter was 89%, and thus the particle diameter was very uniform.

Comparative Example 11 (Production Example of Resin Particles Using an Inorganic Dispersant)

A solution (polymerizable mixture) was obtained by dissolving 0.4 g of 2,2'-azobis(2,4-dimethylvaleronitrile, which is a polymerization initiator, in a mixture (polymerizable monomers) consisting of 28 g of n-butyl methacrylate, 28 g of styrene, and 24 g of ethylene glycol dimethacrylate. The above-described solution was added to a 520 g aqueous solution comprising 0.15 g of sodium lauryl sulfate, which is an anionic surfactant not having a polyoxyethylene chain but having an alkyl group, and 15 g of double-decomposed magnesium pyrophosphate, and a primary suspension so that the volume-average particle diameter of droplets is about 8 μm was prepared with a "T.K. HOMO MIXER MARK II Model 2.5" (high-speed emulsifier/disperser manufactured by PRIMIX® Corporation). Next, a nozzle-type processor (LNP-20/300) was connected to a high-pressure homogenizer ("Nanomizer® LA-33", manufactured by NANO-MIZER® Inc.) and the primary suspension was passed through the high-pressure homogenizer once under a pressure of 300 kg/cm² to make a secondary suspension. This secondary suspension was suspension polymerized for 12 hours at 70° C. to obtain resin particles. Hydrochloric acid was added to the suspension including resin particles to break down the inorganic dispersant into a water-soluble salt and after deliquifying by a centrifugal dehydration technique, ion-exchange water in an amount of 12 times the solid content in the suspension was added to wash the resin particles. Furthermore, after dehydrating by a centrifugal dehydration technique, the resin particles were sufficiently dried in a 60° C. thermostat bath to obtain a dried body of resin particles.

Regarding the obtained resin particles, the volume-average particle diameter was 3.3 μm and the proportion by number of particles having a particle diameter in the range of from 80% to 120% of the volume-average particle diameter was 68%.

Comparative Example 12 (Production Example of Resin Particles Using a Macromonomer Dispersant)

To a reactor having an internal capacity of 2 liters, 635 g of methanol, 225 g of ion-exchange water, 50 g of a 20% by weight methanol solution of a copolymer of methacrylic acid and methyl methacrylate (constitutional ratio of methacrylic acid and methyl methacrylate (methyl methacrylate/methacrylic acid)=8/2, intrinsic viscosity [η]=0.493) as a macromonomer dispersant, and a mixture (polymerizable monomers) of 28 g of n-butyl methacrylate, 28 g of styrene, and 24 g of ethylene glycol dimethacrylate were added and stirred, and the air in the reactor was replaced with nitrogen. Next, the internal temperature of the reactor was raised to 60° C. and the polymerization reaction was initiated by adding 0.4 g of 2,2'-azobis(2,4-dimethylvaleronitrile), which is a polymerization initiator. Several minutes after initiation of the polymerization reaction, the reaction liquid began to become cloudy and it was confirmed that resin particles had formed. After 30 minutes from initiation of the polymerization reaction, 0.5 g of n-docecyl mercaptan, which is a molecular weight modifier, was added. Furthermore, the polymerization reaction was continued, the reaction vessel was cooled 8 hours after initiation of the polymerization reaction, and resin particles recovered. No aggregated particles or scaling (for a portion of the resin particles dispersion is bad and stick attach to wall surface) was seen. Furthermore, after deliquifying the suspension by a pressurized filtration technique, the resin particles were washed by adding ion-exchange water in an amount of 12 times the solid content in the suspension and carrying out pressurized filtration. Deliquification was subsequently carried out by pressurized filtration again and the resin particles were sufficiently dried in a 60° C. thermostat chamber to obtain a dried body of resin particles. Regarding the obtained resin particles, the volume-average particle diameter was 3.5 μm, and the proportion by number of particles having a particle diameter in the range of from 80% to 120% of the volume-average particle diameter was 92%.

[Measurement of Residual Metal Portion]

Regarding the resin particles of Examples 1, 4, 8, 9, and Comparative Example 11, the residual metal (Mg) portion was measured by the ICP (inductively coupled plasma) emission spectroscopic analysis method described below.

1.5 g of the resin particles was accurately weighed and incinerated over 3 hours at 450° C. 2 ml of concentrated hydrochloric acid was subsequently added to the incinerated resin particles and this was diluted without filtering so as to become 25 ml in distilled water to prepare a measurement sample. Regarding this measurement sample, measurement of the residual metal (Mg) portion was carried out using an ICP emission spectrophotometer ("SPS-4000" manufactured by Seiko Instruments Inc.) under the conditions of a photometric height of 10.0 mm, a high-frequency output of 1.30 kw, a carrier flow rate of 1.0 liter/minute, a plasma flow rate of 16.0 liters/minute and an auxiliary flow rate of 0.5 liters/minute. The obtained results are shown in Table 2. Whereas the residual magnesium in the resin particles of Examples 1, 4, 8, and 9 was 1 to 2 ppm, the residual magnesium derived from double-decomposed magnesium pyrophosphate in the resin particles of Comparative Example 11 using double-decomposed magnesium pyrophosphate as a dispersant exceeded 10 ppm.

TABLE 2

|  | Residual Metal Portion [ppm] Mg |
| --- | --- |
| Example 1 | 1 |
| Example 4 | 1 |
| Example 8 | 2 |
| Example 9 | 1 |
| Comparative Example 11 | 14 |

[Measurement of Value of b*]

Regarding the resin particles of Examples 1 to 12 and Comparative Examples 9 to 12, the value of b* was measured with a color and color-difference meter by the following method. Resin particles were placed in an aluminum vessel and heated for 2 hours in a 150° C. thermostatic chamber. Next, the resin particles after heating were cracked in a mortar to obtain a cracked product. Regarding the cracked product, the value of b* was measured by carrying out chromaticity measurement in an L*a*b* color system in accordance with JIS Z 8729 ("Color Display Method—L*a*b* Color System and L*u*v* Color System"). Specifically, 2.5 g of the above-described cracked product was filled in a measurement vessel (powder cell "CR-A50" manufactured by Konica Minolta Sensing, Ltd.). The value of b* of the filled cracked product was measured by a color and color-difference meter ("CR-300" manufactured by Konica Minolta Sensing, Ltd.).

Regarding Comparative Examples 1 to 8, the value of b* was not measured since resin particles having sufficient monodispersity could not be obtained.

[Preparation of Resin Composition for Anti-Glare Film and Preparation of Anti-Glare Film]

80 parts by weight of a mixture of pentaerythritol tri-tetraacrylate and pentaerythritol tetraacrylate (product name "ARONIX® M-305" manufactured by Toagosei Co., Ltd.) as an ultraviolet-curable resin, 120 parts by weight of a mixture of toluene and cyclopentanone (volume ratio of toluene and cyclopentanone=7:3) as an organic solvent, 5 parts by weight of the resin particles produced in Examples 1 to 11 and Comparative Examples 9 to 12, 5 parts by weight of a photo-polymerization initiator (2-methyl-1-[4-(methylthio)phenyl]-2-morpholinopropan-1-one, product name "IRGACURE® 907" manufactured by BASF® Japan Ltd.) were mixed and a resin composition for anti-glare films was prepared as a coating composition.

A polyethylene terephthalate (PET) film, which is a transparent plastic film, having a thickness of 0.2 mm was prepared as the base film. A coating film was formed by applying the above-described resin composition for anti-glare films to one surface of the above-described polyethylene terephthalate film using a bar coater. Next, the above-described coating film was dried by heating the above-described coating film for 1 minute at 80° C. The above-described coating film was cured by subsequently irradiating the above-described coating film with ultraviolet light in a cumulated light amount to 300 mJ/cm² by a high-pressure mercury lamp to form a hard coat layer with an anti-glare property. Hard coat films having an anti-glare property containing the resin particles prepared in Examples 1 to 11 and Comparative Examples 9 to 12 were thereby prepared as anti-glare films (molded articles).

[Evaluation of Anti-Glare Property of Anti-Glare Film]

The anti-glare film was placed directly under a florescent light and the anti-glare property was visually evaluated. As the evaluation standard, it was evaluated as "⊙" (very good) when the outline of the fluorescent light is blurry, as "○" (good) when the outline of the fluorescent light is somewhat blurry, as "Δ" (somewhat bad) when the outline of the fluorescent light is seen and is a little annoying, and as "x" (bad) when the outline of the fluorescent light is clearly seen.

[Measurement of Total Light Transmittance and Haze of Anti-Glare Film]

The total light transmittance of the anti-glare film was measured according to JIS K 7361-1 and the haze of the anti-glare film was measured according to JIS K 7136. Specifically, the total light transmittance and the haze of the anti-glare film was measured using a haze meter ("NDH2000") manufactured by Nippon Denshoku Industries Co., Ltd.

The types and amounts of polymerizable monomers, the types and amounts of anionic surfactants or dispersants, the state after polymerization, and the proportion by number of particles having a particle diameter in the range of from 80% to 120% of the volume-average particle diameter used in Examples 1 to 12 and Comparative Examples 1 to 12, the value of b* of the resin particles in Examples 1 to 12 and Comparative Examples 9 to 12, the evaluation result of the anti-glare property, haze, and total light transmittance of the anti-glare films using the resin particles in Examples 1 to 11 and Comparative Examples 9 to 12 are shown in Table 3 below.

In Table 3, (*1) and (*2) mean the point of adding the anionic surfactant or the dispersant. Specifically, it means adding the anionic surfactant or the dispersant at (*1) the time of absorption and (*2) the time of polymerization. Also, in Table 3, MMA means methyl methacrylate, BMA means n-butyl methacrylate, BA means n-butyl acrylate, St means styrene, and EG means ethylene glycol dimethacrylate. Also, in Table 3, "From 80 to 120% of the Average Particle Diameter Proportion" means the proportion by number of particles having a particle diameter in the range of from 80% to 120% of the volume-average particle diameter.

[Preparation of Light-Diffusing Resin Composition and Light-Diffuser Plate]

After dry blending 100 parts by weight of a methacrylic resin (manufactured by Sumitomo Chemical Co., Ltd., product name "SUMIPEX® EX-A") as a transparent base resin, 10 parts by weight of the resin particles of Example 1, 1 part by weight of an ultraviolet absorber (manufactured by Kyodo Chemical Co., Ltd., product name "Biosorb 520"), 1 part by weight of a processing stabilizer (manufactured by Sumitomo Chemical Co. Ltd., product name SUMILIZER® GP), and 5 parts by weight of sodium stearyl sulfonate and then kneading for 10 minutes at 240° C. in a labo plastomill, the resultant product was cooled and pulverized to obtain a light-diffusing resin composition. No yellowing was seen in this light-diffusing resin composition.

Next, this light-diffusing resin composition was supplied to an injection molder and injection molded at 260° C. to obtain a light-diffuser plate having a length of 100 mm, a width of 50 mm, and a thickness of 2 mm. The obtained light-diffuser plate had a light diffusion property and no yellowing was seen.

In contrast, other than using the resin particles obtained in Comparative Example 9 instead of the resin particles in Example 1, when a light-diffusing resin composition and a light-diffuser plate were prepared under the same conditions as when using the resin particles in Example 1, clear yellowing was seen in the light-diffusing resin composition and the light-diffuser plate.

[Preparation of External Preparation]

10 parts by weight of the resin particles of Example 1, 3 parts by weight of a hydrophobic colloidal silica, 6 parts by weight of talc, 3 parts by weight of titanium dioxide, and an appropriate amount of a pigment were mixed in a kneader to prepare a powder portion. 60.2 parts by weight of purified water, 5 parts by weight of polyethylene glycol, 1 part by weight of triethanol amine, 5 parts by weight of propylene glycol, and 0.5 parts by weight of pea gum were mixed and dissolved with heating to obtain a solution. The above-described powder portion was added to this solution and the powder portion was homogeneously dispersed with a homomixer, and this was warmed to 70° C. to prepare to an aqueous phase. Appropriate amounts of a fragrance and a preservative were added to 2 parts by weight of stearic acid, 0.3 parts by weight of cetyl alcohol, 20 parts by weight of liquid paraffin, 1 part by weight of a polyethylene glycol (10 mol added) monooleate ester, and 1 part by weight of sorbitan trioleate ester and warmed to 70° C. to dissolve with heating to prepare an oily phase. The above-described aqueous phase was added to the above-described oily phase, and after homogeneously emulsifying and dispersing with a homomixer, a foundation was obtained by cooling while stirring. The obtained foundation had good "smoothness" on sensory evaluation.

TABLE 3

| | Polymerizable Monomer (g) | | | | | Anionic Surfactant/Dispersant (g) | | | | |
|---|---|---|---|---|---|---|---|---|---|---|
| | | | | | | Sodium dioctyl | HITENOL | Phosphanol | PLY-SURF | PLY-SURF |
| | MMA | BMA | BA | St | EG | sulfosuccinate | NF-17 | LO-529 | AL | A208F |
| Example 1 | — | 28 | — | 28 | 24 | 0.8 (*1) | — | 0.8 (*2) | — | — |
| Example 2 | — | — | 28 | 28 | 24 | 0.8 (*1) | — | 0.8 (*2) | — | — |
| Example 3 | — | — | — | 56 | 24 | 0.8 (*1) | — | 0.8 (*2) | — | — |
| Example 4 | — | 28 | — | 28 | 24 | 0.8 (*1) | 0.8 (*2) | — | — | — |
| Example 5 | — | 56 | — | — | 24 | 0.8 (*1) | — | 0.8 (*2) | — | — |
| Example 6 | — | 28 | 28 | — | 24 | 0.8 (*1) | — | 0.8 (*2) | — | — |
| Example 7 | — | 56 | — | — | 24 | 0.8 (*1) | 0.8 (*2) | — | — | — |
| Example 8 | — | 56 | — | — | 24 | 0.8 (*1) | — | — | 0.8 (*2) | — |
| Example 9 | — | 56 | — | — | 24 | 0.8 (*1) | — | — | — | 0.8 (*2) |
| Example 10 | — | 32 | — | 24 | 24 | 0.8 (*1) | — | 0.8 (*2) | — | — |
| Example 11 | — | 28 | 28 | — | 24 | 0.8 (*1) | — | 0.8 (*2) | — | — |
| Example 12 | 32 | — | — | 24 | 24 | Sodium dodecylbenzene sulfonate 0.8 (*1) | — | 0.8 (*2) | — | — |
| Comparative Example 1 | — | 28 | — | 28 | 24 | — | — | 1.6 (*1) | — | — |
| Comparative Example 2 | — | 28 | — | 28 | 24 | 0.8 (*1) | — | 0.8 (*1) | — | — |
| Comparative Example 3 | — | 28 | — | 28 | 24 | — | 0.8 (*1) | 0.8 (*2) | — | — |
| Comparative Example 4 | — | 28 | — | 28 | 24 | 0.8 (*2) | — | 0.8 (*1) | — | — |
| Comparative Example 5 | — | 56 | — | — | 24 | — | — | 1.6 (*1) | — | — |
| Comparative Example 6 | — | 56 | — | — | 24 | 0.8 (*1) | — | 0.8 (*1) | — | — |
| Comparative Example 7 | — | 56 | — | — | 24 | — | 0.8 (*1) | 0.8 (*2) | — | — |

TABLE 3-continued

| | | | | | | |
|---|---|---|---|---|---|---|
| Comparative Example 8 | — | 56 | — | — | 24 | 0.8 (*2) — 0.8 (*1) — — |
| Comparative Example 9 | — | 28 | 28 | — | 24 | Polyvinyl alcohol 0.8 (*1) |
| Comparative Example 10 | — | 28 | — | 28 | 24 | Polyvinyl alcohol 0.8 (*1) |
| Comparative Example 11 | — | 28 | — | 28 | 24 | Mg pyrophosphate 15 and Na lauryl sulfate 0.15 (*1) |
| Comparative Example 12 | — | 28 | — | 28 | 24 | 20% methanol aqueous solution of MMA-MAA copolymer (MMA/MAA = 8/2) 50 (*1) |

| | State After Polymerization | From 80 to 120% of Average Particle Diameter Proportion | Value of b* | Optical Properties of Anti-Glare Film | | |
|---|---|---|---|---|---|---|
| | | | | Anti-glare Property | Haze | Total Light Transmitance |
| Example 1 | No aggregation | 90% | 0.49 | ⊖ | 2.3% | 92.2% |
| Example 2 | No aggregation | 85% | 0.98 | ⊖ | 5.4% | 93.5% |
| Example 3 | No aggregation | 86% | 0.70 | ⊖ | 3.2% | 92.8% |
| Example 4 | No aggregation | 88% | 0.53 | ◯ | 4.8% | 93.5% |
| Example 5 | No aggregation | 91% | 0.95 | ⊖ | 2.8% | 94.4% |
| Example 6 | No aggregation | 88% | 0.92 | ⊖ | 2.8% | 93.8% |
| Example 7 | No aggregation | 90% | 0.56 | ◯ | 3.6% | 93.8% |
| Example 8 | No aggregation | 92% | 0.60 | ◯ | 4.7% | 92.1% |
| Example 9 | No aggregation | 90% | 0.48 | ◯ | 4.2% | 93.0% |
| Example 10 | No aggregation | 87% | 0.47 | ⊖ | 2.7% | 96.5% |
| Example 11 | No aggregation | 88% | 0.94 | ⊖ | 3.6% | 94.7% |
| Example 12 | No aggregation | 84% | 0.73 | ◯ | 4.6% | 94.1% |
| Comparative Example 1 | Absorption deficiency | 80% | — | — | — | — |
| Comparative Example 2 | Aggregation | 81% | — | — | — | — |
| Comparative Example 3 | Absorption deficiency | 76% | — | — | — | — |
| Comparative Example 4 | Absorption deficiency | 78% | — | — | — | — |
| Comparative Example 5 | Absorption deficiency | 78% | — | — | — | — |
| Comparative Example 6 | Aggregation | 74% | — | — | — | — |
| Comparative Example 7 | Absorption deficiency | 76% | — | — | — | — |
| Comparative Example 8 | Absorption deficiency | 72% | — | — | — | — |
| Comparative Example 9 | No aggregation | 89% | 2.98 | ◯ | 3.6% | 93.2% |
| Comparative Example 10 | No aggregation | 89% | 2.79 | ◯ | 5.0% | 92.1% |
| Comparative Example 11 | No aggregation | 68% | 0.88 | X | 3.1% | 95.3% |
| Comparative Example 12 | No aggregation | 92% | 0.55 | Δ | 20.6% | 88.2% |

In Examples 1 to 12, two types of anionic surfactants, i.e. a first anionic surfactant not having a polyoxyethylene chain but having an alkyl group and a second anionic surfactant having a polyoxyethylene chain were used, and by adding the first anionic surfactant at the time of absorption and the second anionic surfactant at the time of polymerization, resin particles with excellent monodispersity and no yellowing when heated could be obtained.

In Comparative Examples 1, 3, 5, and 7, since only one anionic surfactant was used among the above-described two anionic surfactants, absorption of the polymerizable mixture into the seed particles was insufficient and resin particles with excellent monodispersity could not be obtained.

In Comparative Examples 2, 4, 6, 8, when the use period of the anionic surfactant was changed, resin particles with excellent monodispersity could not be obtained since absorption was insufficient (Comparative Examples 4 and 8) or aggregated particles formed (Comparative Examples 2 and 6)

In Comparative Examples 9 and 10, since a water-soluble polymer dispersant (polyvinyl alcohol) was used, yellowing derived from the water-soluble polymer dispersant (polyvinyl alcohol) occurred in the resin particles when said resin particles were heated for 2 hours at 150° C.

In Comparative Example 11 using double-decomposed magnesium pyrophosphate as a dispersant, the anti-glare property of the anti-glare film deteriorated compared to the examples. This is for the following reason. That is, in Comparative Example 11, since double-decomposed magnesium pyrophosphate was used as a dispersant, double-decomposed magnesium pyrophosphate is included in the suspension of suspension polymerization. It is possible to break down the double-decomposed magnesium pyrophosphate and remove such to a certain extent by acid washing the above-described suspension using an acid such as hydrochloric acid. However, it is difficult to completely remove the metal portion (magnesium) and a (minute amount of metal portion exceeding 10 ppm remains on the resin particle surface. For this reason, the resin particles cause microaggregation in the binder by ionic bonding caused by bivalent magnesium, thus deteriorating the anti-glare property of the anti-glare film. When another inorganic dispersant is used, it is considered for the same reason that the anti-glare property of the anti-glare film will deteriorate since a metal portion exceeding 10 ppm remains on the resin particle surface.

In Comparative Example 12 using a macromonomer as a dispersant, total light transmittance and haze of the anti-glare film deteriorated compared to the examples. This is, since a macromonomer was used as a dispersant in Comparative Example 12, the copolymerization site of the methacrylic acid included in the macromonomer partially crystallized, generating white turbidity in the resin particles.

The present invention may be embodied in other various forms without departing from the spirit or essential characteristics thereof. For this reason, the above-described examples are to be considered in all respects as illustrative and not restrictive. The scope of the present invention is indicated by the claims and is not restricted by the text in the specification. All modification and changes which come within the meaning and scope of equivalency of the claims are included in the scope of the present invention.

Also, this application claims priority based on Japanese Patent Application No. 2010-217613 filed in Japan on Sep. 28, 2010 and Japanese Patent Application No. 2010-217620 filed in Japan on Sep. 28, 2010, the content of which is incorporated herein by reference.

The invention claimed is:

1. Resin particles that:
are obtained by the process comprising
absorbing a polymerizable mixture comprising a polymerizable monomer comprising at least one of a monofunctional styrene-based monomer and a monofunctional (meth)acrylic-based monomer, and a polymerization initiator into seed particles in an aqueous medium, without using a dispersant, in the presence of an anionic surfactant not having a polyoxyethylene chain but having an alkyl group; and
polymerizing the polymerizable monomer in an aqueous medium, without using a dispersant, in the presence of an anionic surfactant having a polyoxyethylene chain to thereby obtain resin particles; wherein
the anionic surfactant having a polyoxyethylene chain is added at the time of the polymerization,
the resin particles comprises a resin derived from a polymerizable monomer comprising at least one of a monofunctional styrene-based monomer and a monofunctional (meth)acrylic-based monomer, and
the resin particles exhibit a b* value in the range of from −1.0 to +2.0, as measured with a color and color-difference meter, when subjected to a heat treatment for 2 hours at 150° C. in a thermostatic chamber.

2. Resin particles comprising a resin derived from a polymerizable monomer comprising at least one of a monofunctional styrene-based monomer and a monofunctional (meth)acrylic-based monomer, wherein
the proportion by number of particles having a particle diameter in the range of from 80 to 120% of the volume-average particle diameter is 83% or more, and
the resin particles exhibit a b* value in the range of from −1.0 to +1.0, as measured with a color and color-difference meter, when subjected to a heat treatment for 2 hours at 150° C. in a thermostatic chamber.

3. The resin particles according to claim 2, wherein a magnesium content is 10 ppm or less.

4. The resin particles according to claim 2, wherein the polymerizable monomer further comprises at least one of a multifunctional styrene-based monomer and a multifunctional (meth)acrylic-based monomer.

5. The resin particles according to claim 4, wherein the multifunctional (meth)acrylic-based monomer is in a range of from 5 to 30% by weight of the polymerizable monomer.

6. The resin particles according to claim 2, wherein the polymerizable monomer comprises a monofunctional (meth)acrylic-based monomer wherein the monofunctional (meth)acrylic-based monomer is an alkyl (meth)acrylate, and wherein the number of carbons of the alkyl is from 2 to 12.

7. The resin particles according to claim 2, produced by a seed polymerization method.

8. An anti-glare film obtained by coating a coating composition comprising the resin particles according to claim 2 onto a transparent base film.

9. An external preparation comprising the resin particles according to claim 2.

10. A coating composition comprising the resin particles according to claim 2.

11. A light-diffusing resin composition comprising the resin particles according to claim 2.

12. A light-diffusing resin molded article obtained by molding the light-diffusing resin composition according to claim 11.

13. An external preparation comprising the resin particles according to claim 4.

14. A coating composition comprising the resin particles according to claim 4.

15. An anti-glare film obtained by coating the coating composition according to claim 14 onto a transparent base film.

16. A light-diffusing resin composition comprising the resin particles according to claim 4.

17. A light-diffusing resin molded article obtained by molding the light-diffusing resin composition according to claim 16.

18. A process for producing the resin particles according to claim 2, the process comprising:
absorbing a polymerizable mixture comprising a polymerizable monomer comprising at least one of a monofunctional styrene-based monomer and a monofunctional (meth)acrylic-based monomer, and a polymerization initiator into seed particles in an aqueous medium, without using a dispersant, in the presence of an anionic surfactant not having a polyoxyethylene chain but having an alkyl group; and
polymerizing the polymerizable monomer in an aqueous medium, without using a dispersant, in the presence of an anionic surfactant having a polyoxyethylene chain to thereby obtain resin particles; wherein
the anionic surfactant having a polyoxyethylene chain is added at the time of the polymerization,
the proportion by number of the resin particles having a particle diameter in the range of from 80 to 120% of the volume-average particle diameter is 83% or more, and
the resin particles exhibit a b* value in the range of from −1.0 to +1.0, as measured with a color and color-difference meter, when subjected to a heat treatment for 2 hours at 150° C. in a thermostatic chamber.

19. The process for producing resin particles according to claim 1, wherein the anionic surfactant not having a polyoxyethylene chain but having an alkyl group is at least one compound selected from the group consisting of alkyl sulfosuccinates, alkyl sulfonates, and alkyl sulfoacetates, and the anionic surfactant having a polyoxyethylene chain is at least one compound selected from the group consisting of polyoxyethylene aryl ether phosphates, polyoxyethylene alkyl ether phosphates, polyoxyethylene alkyl ether sulfates, polyoxyethylene aryl ether sulfates, and polyoxyethylene alkyl sulfosuccinates.

20. The process for producing resin particles according to claim 1, wherein the anionic surfactant not having a polyoxyethylene chain but having an alkyl group is a dialkyl sulfo succinate, and the anionic surfactant having a polyoxyethylene chain is at least one of a polyoxyethylene alkyl ether phosphate and a polyoxyethylene aryl ether sulfate.

21. The process for producing resin particles according to claim 1, wherein the polymerizable monomer comprises a monofunctional (meth)acrylic-based monomer, and 30 to 500 parts by weight of the polymerizable mixture based on 1 part by weight of seed articles is absorbed.

* * * * *